(12) United States Patent  
Tsutsumi

(10) Patent No.: US 9,189,776 B2  
(45) Date of Patent: Nov. 17, 2015

(54) IMAGE EDITING DEVICE, IMAGE EDITING METHOD, AND NON-TRANSITORY COMPUTER-READABLE RECORDING MEDIUM ENCODED WITH IMAGE EDITING PROGRAM

(71) Applicant: KONICA MINOLTA, INC., Chiyoda-ku (JP)

(72) Inventor: Takahiro Tsutsumi, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/260,355

(22) Filed: Apr. 24, 2014

(65) Prior Publication Data

US 2014/0333961 A1    Nov. 13, 2014

(30) Foreign Application Priority Data

May 8, 2013    (JP) ................................. 2013-098703

(51) Int. Cl.
```
G06F 15/00    (2006.01)
G06Q 10/10    (2012.01)
H04N 1/00     (2006.01)
G06T 11/60    (2006.01)
```
(52) U.S. Cl.
CPC .............. *G06Q 10/107* (2013.01); *G06T 11/60* (2013.01); *H04N 1/0035* (2013.01)

(58) Field of Classification Search
CPC ..... G06Q 10/107; H04N 1/0035; G06T 11/60
USPC ....................................................... 358/1.15
See application file for complete search history.

(56) References Cited

U.S. PATENT DOCUMENTS

| | | | |
|---|---|---|---|
| 6,043,823 A | 3/2000 | Kodaira et al. | |
| 2007/0133074 A1* | 6/2007 | Fabrice | ......................... 358/537 |

FOREIGN PATENT DOCUMENTS

| | | |
|---|---|---|
| JP | 09-091450 | 4/1997 |
| JP | 2005-250970 | 9/2005 |
| JP | 2007-037067 | 2/2007 |
| JP | 2007-150858 | 6/2007 |
| JP | 2008-072172 A | 3/2008 |

OTHER PUBLICATIONS

Notice of Ground of Rejection issued in corresponding Japanese Patent Application No. 2013-098703, dated Feb. 3, 2015 and English translation.

* cited by examiner

*Primary Examiner* — Saeid Ebrahimi Dehkordy

(74) *Attorney, Agent, or Firm* — Buchanan Ingersoll & Rooney PC

(57) ABSTRACT

The image editing device is provided with an area specifying portion to associate identification information for identifying an area of interest with each of a plurality of areas into which an image of original data is divided, an image generating portion to generate an edit image by disposing onto the image of the original data a section image enclosing the area of interest for each of a plurality of areas in association with an image indicating the identification information, a transmission portion to transmit a first electronic mail including the edit image, a reception portion to receive a second electronic mail transmitted back in response to the first electronic mail, an editing portion to generate edited data obtained by updating the original data based on an editing instruction included in the second electronic mail, and an output portion to output the edited data generated.

31 Claims, 20 Drawing Sheets

F I G. 1
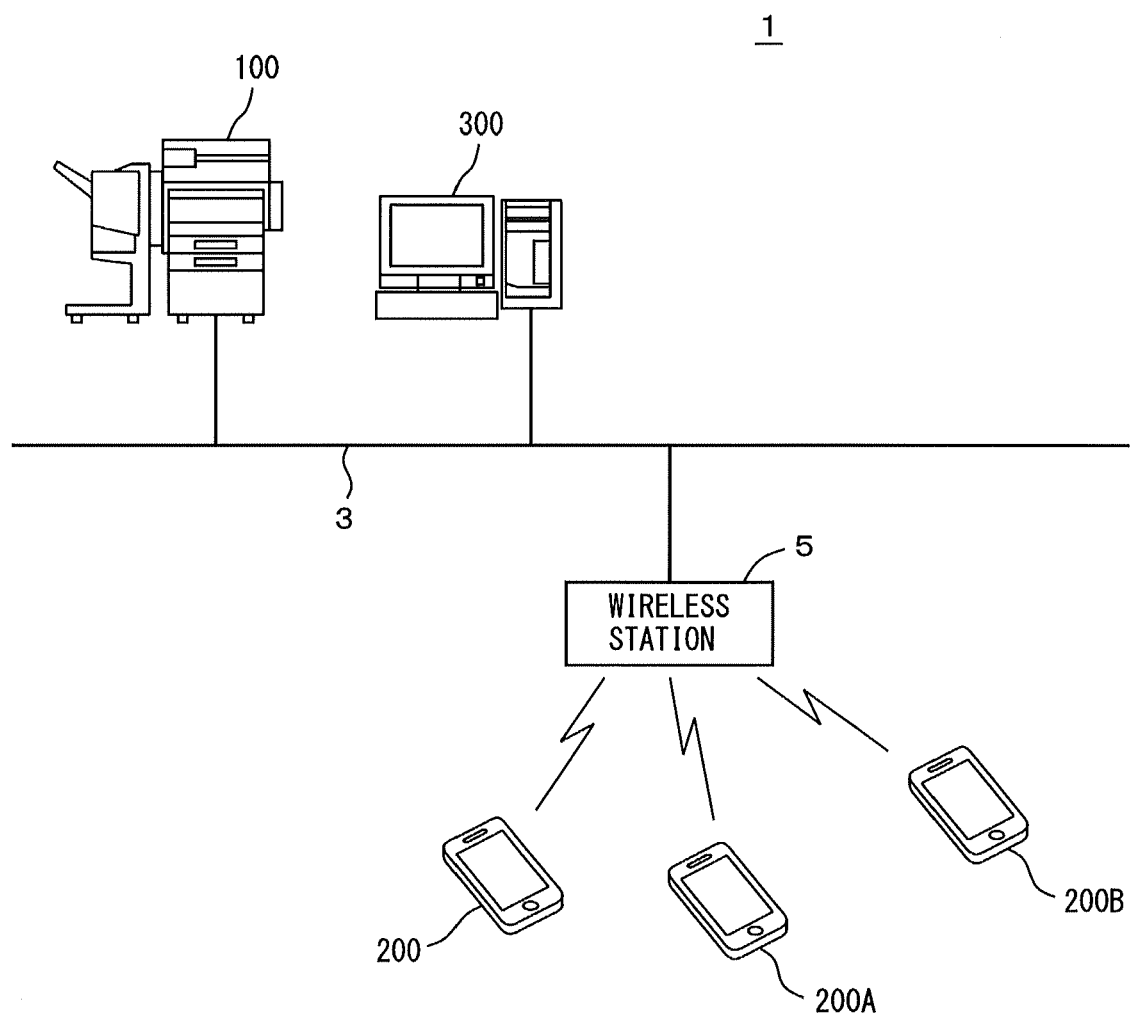

F I G. 4
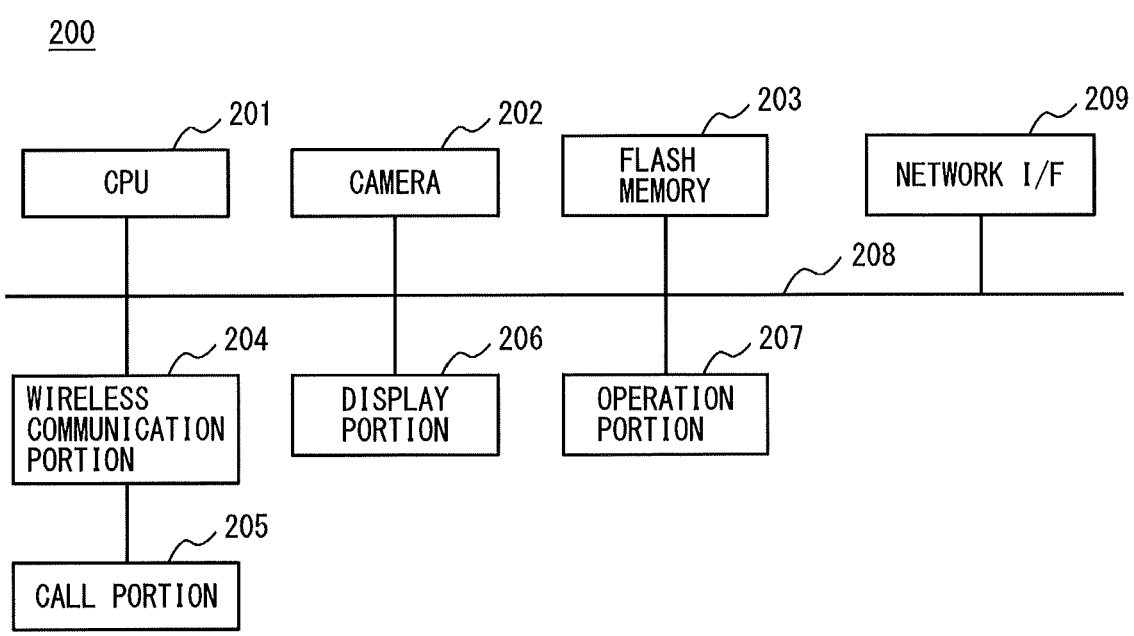

FIG. 7

```
MODIFICATION INSTRUCTION E-MAIL
  [1. COMMAND DESIGNATION]
   PLEASE DESIGNATE ONE OF DELETION, MOVING,       ⎫
   ADDITION, SUBSTITUTION, DIVISION, AND           ⎬ — 71
   COMBINATION AS A MODIFICATION INSTRUCTION.      ⎭
   DESIGNATION COMMAND:            } 73

[2. MODIFICATION TARGET NUMBER]
   FOR DELETION, MOVING, ADDITION,
   SUBSTITUTION, OR DIVISION, PLEASE DESIGNATE
   THE NUMBER ON THE ATTACHMENT IMAGE OF THIS
   E-MAIL.
   FOR ADDITION OR SUBSTITUTION, PLEASE STATE      ⎫
   "ATTACHMENT" WHEN DESIGNATING A FILE TO BE      ⎬ — 75
   ATTACHED TO THE REPLY E-MAIL.
   FOR COMBINATION, PLEASE MAKE SURE TO
   DESIGNATE MULTIPLE NUMBERS.
   FOR SUBSTITUTION, ONE NUMBER OR MULTIPLE
   NUMBERS MAY BE DESIGNATED.                      ⎭
   MODIFICATION TARGET NUMBER:     } 77

[3. MOVING/ADDITION DESTINATION NUMBER]
   FOR MOVING, ADDITION, OR SUBSTITUTION,          ⎫
   PLEASE DESIGNATE THE NUMBER OF MOVING
   DESTINATION, ADDITION DESTINATION, OR
   SUBSTITUTION DESTINATION ON THE IMAGE           ⎬ — 79
   ATTACHED TO THIS E-MAIL.
   PLEASE DESIGNATE WHICH SIDE OF THE
   DESIGNATION NUMBER IT IS BY ABOVE, BELOW,
   LEFT, OR RIGHT.                                 ⎭
   MOVING/ADDITION/SUBSTITUTION DESTINATION  ⎫ 81
   NUMBER:                                   ⎭
   WHICH SIDE:                    } 83
```

MODIFICATION INSTRUCTION E-MAIL
 [1. COMMAND DESIGNATION]
  PLEASE DESIGNATE ONE OF DELETION, MOVING,         ⎫
  ADDITION, SUBSTITUTION, DIVISION, AND              ⎬ — 71
  COMBINATION AS A MODIFICATION INSTRUCTION.         ⎭
  DESIGNATION COMMAND: DELETION       } 73

[2. MODIFICATION TARGET NUMBER]
  FOR DELETION, MOVING, ADDITION,                    ⎫
  SUBSTITUTION, OR DIVISION, PLEASE DESIGNATE        ⎪
  THE NUMBER ON THE ATTACHMENT IMAGE OF THIS         ⎪
  E-MAIL.                                            ⎪
  FOR ADDITION OR SUBSTITUTION, PLEASE STATE         ⎪
  "ATTACHMENT" WHEN DESIGNATING A FILE TO BE         ⎬ — 75
  ATTACHED TO THE REPLY E-MAIL.                      ⎪
  FOR COMBINATION, PLEASE MAKE SURE TO               ⎪
  DESIGNATE MULTIPLE NUMBERS.                        ⎪
  FOR SUBSTITUTION, ONE NUMBER OR MULTIPLE           ⎪
  NUMBERS MAY BE DESIGNATED.                         ⎭
  MODIFICATION TARGET NUMBER: 5       } 77

[3. MOVING/ADDITION DESTINATION NUMBER]
  FOR MOVING, ADDITION, OR SUBSTITUTION,             ⎫
  PLEASE DESIGNATE THE NUMBER OF MOVING              ⎪
  DESTINATION, ADDITION DESTINATION, OR              ⎪
  SUBSTITUTION DESTINATION ON THE IMAGE              ⎬ — 79
  ATTACHED TO THIS E-MAIL.                           ⎪
  PLEASE DESIGNATE WHICH SIDE OF THE                 ⎪
  DESIGNATION NUMBER IT IS BY ABOVE, BELOW,          ⎪
  LEFT, OR RIGHT.                                    ⎭
  MOVING/ADDITION/SUBSTITUTION DESTINATION  ⎫ 81
  NUMBER:                                   ⎭
  WHICH SIDE:                        } 83

MODIFICATION INSTRUCTION E-MAIL
  [1. COMMAND DESIGNATION]
    PLEASE DESIGNATE ONE OF DELETION, MOVING,
    ADDITION, SUBSTITUTION, DIVISION, AND            ⎬ 71
    COMBINATION AS A MODIFICATION INSTRUCTION.
    DESIGNATION COMMAND: MOVING           ⎬ 73

[2. MODIFICATION TARGET NUMBER]
    FOR DELETION, MOVING, ADDITION,
    SUBSTITUTION, OR DIVISION, PLEASE DESIGNATE
    THE NUMBER ON THE ATTACHMENT IMAGE OF THIS
    E-MAIL.
    FOR ADDITION OR SUBSTITUTION, PLEASE STATE
    "ATTACHMENT" WHEN DESIGNATING A FILE TO BE       ⎬ 75
    ATTACHED TO THE REPLY E-MAIL.
    FOR COMBINATION, PLEASE MAKE SURE TO
    DESIGNATE MULTIPLE NUMBERS.
    FOR SUBSTITUTION, ONE NUMBER OR MULTIPLE
    NUMBERS MAY BE DESIGNATED.
    MODIFICATION TARGET NUMBER: 5         ⎬ 77

[3. MOVING/ADDITION DESTINATION NUMBER]
    FOR MOVING, ADDITION, OR SUBSTITUTION,
    PLEASE DESIGNATE THE NUMBER OF MOVING
    DESTINATION, ADDITION DESTINATION, OR
    SUBSTITUTION DESTINATION ON THE IMAGE            ⎬ 79
    ATTACHED TO THIS E-MAIL.
    PLEASE DESIGNATE WHICH SIDE OF THE
    DESIGNATION NUMBER IT IS BY ABOVE, BELOW,
    LEFT, OR RIGHT.
    MOVING/ADDITION/SUBSTITUTION DESTINATION ⎬ 81
    NUMBER: 4
    WHICH SIDE: ABOVE                     ⎬ 83

MODIFICATION INSTRUCTION E-MAIL
 [1. COMMAND DESIGNATION]
   PLEASE DESIGNATE ONE OF DELETION, MOVING,
   ADDITION, SUBSTITUTION, DIVISION, AND         ⎬ 71
   COMBINATION AS A MODIFICATION INSTRUCTION.
   DESIGNATION COMMAND: ADDITION        } 73

[2. MODIFICATION TARGET NUMBER]
   FOR DELETION, MOVING, ADDITION,
   SUBSTITUTION, OR DIVISION, PLEASE DESIGNATE
   THE NUMBER ON THE ATTACHMENT IMAGE OF THIS
   E-MAIL.
   FOR ADDITION OR SUBSTITUTION, PLEASE STATE
   "ATTACHMENT" WHEN DESIGNATING A FILE TO BE    ⎬ 75
   ATTACHED TO THE REPLY E-MAIL.
   FOR COMBINATION, PLEASE MAKE SURE TO
   DESIGNATE MULTIPLE NUMBERS.
   FOR SUBSTITUTION, ONE NUMBER OR MULTIPLE
   NUMBERS MAY BE DESIGNATED.
   MODIFICATION TARGET NUMBER: ATTACHMENT } 77

[3. MOVING/ADDITION DESTINATION NUMBER]
   FOR MOVING, ADDITION, OR SUBSTITUTION,
   PLEASE DESIGNATE THE NUMBER OF MOVING
   DESTINATION, ADDITION DESTINATION, OR
   SUBSTITUTION DESTINATION ON THE IMAGE         ⎬ 79
   ATTACHED TO THIS E-MAIL.
   PLEASE DESIGNATE WHICH SIDE OF THE
   DESIGNATION NUMBER IT IS BY ABOVE, BELOW,
   LEFT, OR RIGHT.
   MOVING/ADDITION/SUBSTITUTION DESTINATION ⎱ 81
   NUMBER: 4
   WHICH SIDE: RIGHT                     } 83

┌─────────────────────────────────────────────────┐
│                                                 │
│  MODIFICATION INSTRUCTION E-MAIL                │
│   [1. COMMAND DESIGNATION]                      │
│    PLEASE DESIGNATE ONE OF DELETION, MOVING, ⎫  │
│    ADDITION, SUBSTITUTION, DIVISION, AND     ⎬ 71
│    COMBINATION AS A MODIFICATION INSTRUCTION.⎭  │
│    DESIGNATION COMMAND: SUBSTITUTION  } 73      │
│                                                 │
│   [2. MODIFICATION TARGET NUMBER]               │
│    FOR DELETION, MOVING, ADDITION,           ⎫  │
│    SUBSTITUTION, OR DIVISION, PLEASE DESIGNATE  │
│    THE NUMBER ON THE ATTACHMENT IMAGE OF THIS   │
│    E-MAIL.                                      │
│    FOR ADDITION OR SUBSTITUTION, PLEASE STATE   │
│    "ATTACHMENT" WHEN DESIGNATING A FILE TO BE⎬ 75
│    ATTACHED TO THE REPLY E-MAIL.                │
│    FOR COMBINATION, PLEASE MAKE SURE TO         │
│    DESIGNATE MULTIPLE NUMBERS.                  │
│    FOR SUBSTITUTION, ONE NUMBER OR MULTIPLE     │
│    NUMBERS MAY BE DESIGNATED.                ⎭  │
│    MODIFICATION TARGET NUMBER: ATTACHMENT } 77  │
│                                                 │
│   [3. MOVING/ADDITION DESTINATION NUMBER]       │
│    FOR MOVING, ADDITION, OR SUBSTITUTION,    ⎫  │
│    PLEASE DESIGNATE THE NUMBER OF MOVING        │
│    DESTINATION, ADDITION DESTINATION, OR        │
│    SUBSTITUTION DESTINATION ON THE IMAGE     ⎬ 79
│    ATTACHED TO THIS E-MAIL.                     │
│    PLEASE DESIGNATE WHICH SIDE OF THE           │
│    DESIGNATION NUMBER IT IS BY ABOVE, BELOW,    │
│    LEFT, OR RIGHT.                           ⎭  │
│    MOVING/ADDITION/SUBSTITUTION DESTINATION ⎫81 │
│    NUMBER: 4, 5                             ⎭   │
│    WHICH SIDE:                         } 83     │
│                                                 │
└─────────────────────────────────────────────────┘
```

F I G. 1 5
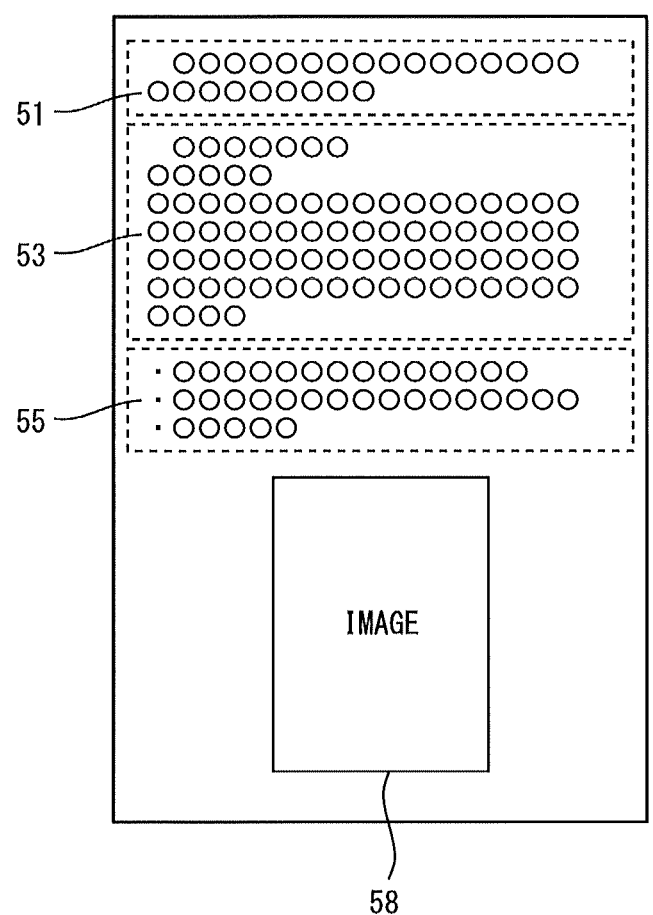

```
MODIFICATION INSTRUCTION E-MAIL
  [1. COMMAND DESIGNATION]
    PLEASE DESIGNATE ONE OF DELETION, MOVING,      ⎫
    ADDITION, SUBSTITUTION, DIVISION, AND          ⎬ 71
    COMBINATION AS A MODIFICATION INSTRUCTION.     ⎭
    DESIGNATION COMMAND: DIVISION       } 73

[2. MODIFICATION TARGET NUMBER]
    FOR DELETION, MOVING, ADDITION,                ⎫
    SUBSTITUTION, OR DIVISION, PLEASE DESIGNATE    ⎪
    THE NUMBER ON THE ATTACHMENT IMAGE OF THIS     ⎪
    E-MAIL.                                        ⎪
    FOR ADDITION OR SUBSTITUTION, PLEASE STATE     ⎪
    "ATTACHMENT" WHEN DESIGNATING A FILE TO BE     ⎬ 75
    ATTACHED TO THE REPLY E-MAIL.                  ⎪
    FOR COMBINATION, PLEASE MAKE SURE TO           ⎪
    DESIGNATE MULTIPLE NUMBERS.                    ⎪
    FOR SUBSTITUTION, ONE NUMBER OR MULTIPLE       ⎪
    NUMBERS MAY BE DESIGNATED.                     ⎭
    MODIFICATION TARGET NUMBER: 3        } 77

[3. MOVING/ADDITION DESTINATION NUMBER]
    FOR MOVING, ADDITION, OR SUBSTITUTION,         ⎫
    PLEASE DESIGNATE THE NUMBER OF MOVING          ⎪
    DESTINATION, ADDITION DESTINATION, OR          ⎪
    SUBSTITUTION DESTINATION ON THE IMAGE          ⎬ 79
    ATTACHED TO THIS E-MAIL.                       ⎪
    PLEASE DESIGNATE WHICH SIDE OF THE             ⎪
    DESIGNATION NUMBER IT IS BY ABOVE, BELOW,      ⎪
    LEFT, OR RIGHT.                                ⎭
    MOVING/ADDITION/SUBSTITUTION DESTINATION  ⎫ 81
    NUMBER:                                   ⎭
    WHICH SIDE:                         } 83
```

F I G. 1 7
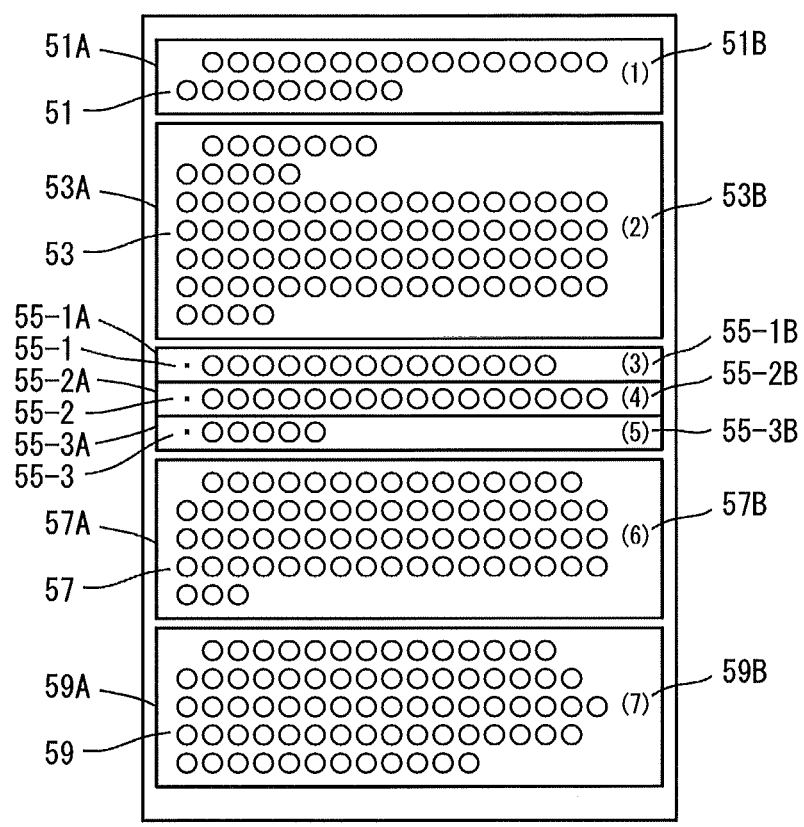

MODIFICATION INSTRUCTION E-MAIL
  [1. COMMAND DESIGNATION]
    PLEASE DESIGNATE ONE OF DELETION, MOVING, ⎫
    ADDITION, SUBSTITUTION, DIVISION, AND ⎬ — 71
    COMBINATION AS A MODIFICATION INSTRUCTION. ⎭
    DESIGNATION COMMAND: COMBINATION   } 73

[2. MODIFICATION TARGET NUMBER]
    FOR DELETION, MOVING, ADDITION, ⎫
    SUBSTITUTION, OR DIVISION, PLEASE DESIGNATE ⎪
    THE NUMBER ON THE ATTACHMENT IMAGE OF THIS ⎪
    E-MAIL. ⎪
    FOR ADDITION OR SUBSTITUTION, PLEASE STATE ⎪
    "ATTACHMENT" WHEN DESIGNATING A FILE TO BE ⎬ — 75
    ATTACHED TO THE REPLY E-MAIL. ⎪
    FOR COMBINATION, PLEASE MAKE SURE TO ⎪
    DESIGNATE MULTIPLE NUMBERS. ⎪
    FOR SUBSTITUTION, ONE NUMBER OR MULTIPLE ⎪
    NUMBERS MAY BE DESIGNATED. ⎭
    MODIFICATION TARGET NUMBER: 3, 4, 5   } 77

[3. MOVING/ADDITION DESTINATION NUMBER]
    FOR MOVING, ADDITION, OR SUBSTITUTION, ⎫
    PLEASE DESIGNATE THE NUMBER OF MOVING ⎪
    DESTINATION, ADDITION DESTINATION, OR ⎪
    SUBSTITUTION DESTINATION ON THE IMAGE ⎬ — 79
    ATTACHED TO THIS E-MAIL. ⎪
    PLEASE DESIGNATE WHICH SIDE OF THE ⎪
    DESIGNATION NUMBER IT IS BY ABOVE, BELOW, ⎪
    LEFT, OR RIGHT. ⎭
    MOVING/ADDITION/SUBSTITUTION DESTINATION ⎫
    NUMBER: ⎬ 81
    WHICH SIDE:   } 83

US 9,189,776 B2

IMAGE EDITING DEVICE, IMAGE EDITING METHOD, AND NON-TRANSITORY COMPUTER-READABLE RECORDING MEDIUM ENCODED WITH IMAGE EDITING PROGRAM

This application is based on Japanese Patent Application No. 2013-098703 filed with Japan Patent Office on May 8, 2013, the entire content of which is hereby incorporated by reference.

BACKGROUND OF THE INVENTION

1. Field of the Invention

The present invention relates to an image editing device, an image editing method, and a non-transitory computer-readable recording medium encoded with an image editing program, and more specifically to an image editing device which is capable of communicating with a portable information device, an image editing method to be executed by that image editing device, and a non-transitory computer-readable recording medium encoded with an image editing program.

2. Description of the Related Art

In some cases in a conference, when discussions are conducted using sheets of a document printed out by a multi function peripheral (MFP), it becomes necessary to make minor alterations to the contents. In such cases, conventionally, an application program such as a word processor had to be executed on a personal computer (PC) to re-edit the original data which is the original of the data formed as an image on the sheets printed out and to print out the edited original data.

Japanese Patent Laid-Open No. 2008-072172 describes an image processing device which analyzes image data generated by photographing a subject to be photographed, thereby categorizing the image data into multiple prescribed classifications based on the subject to be photographed, and thereafter adding a correction according to the classifications, and which is provided with a correction content storage means to store by the classifications the correction content to be added to the image data, a degree-of-congruence detection means to detect the degree of congruence of the image data for each of the classifications by analyzing the image data, a degree-of-congruence modification means to modify the degree of congruence for each of the classifications detected, and an image data correction means to add a correction to the image data by reflecting the correction content stored for each of the classifications in a proportion corresponding to the congruence modified.

However, while a conventional image processing device is able to perform different image processing partially within the image data, there is a problem that multiple parts within the image data cannot be altered.

SUMMARY OF THE INVENTION

According to one aspect of the present invention, an image editing device is provided with a division portion to divide an image of original data into a plurality of areas, an area specifying portion to associate, for each of the plurality of areas divided, identification information for identifying an area of interest with the area of interest, an image generating portion to generate an edit image for editing by disposing, for each of the plurality of areas, a section image enclosing the area of interest onto the image of the original data and further disposing an image indicating the identification information of the area of interest in association with the section image, a transmission portion to transmit a first electronic mail including the edit image generated, a reception portion to receive a second electronic mail transmitted back in response to the first electronic mail transmitted, an editing portion to generate edited data by updating the original data based on an editing instruction included in the second electronic mail received by the reception portion, and an output portion to output the edited data generated.

According to another aspect of the present invention, an image editing method causes an image editing device to execute a dividing step to divide an image of original data into a plurality of areas, an area specifying step to associate, for each of the plurality of areas divided, identification information for identifying an area of interest with the area of interest, an image generating step to generate an edit image by disposing, for each of the plurality of areas, a section image enclosing the area of interest onto the image of the original data and further disposing an image indicating the identification information of the area of interest in association with the section image, a transmitting step to transmit a first electronic mail with the edit image generated attached thereto, a receiving step to receive a second electronic mail transmitted back in response to the first electronic mail transmitted, an editing executing step to generate edited data by updating the original data based on an editing instruction included in the second electronic mail received in the receiving step, and an outputting step to output the edited data generated.

According to a further aspect of the present invention, a non-transitory computer-readable recording medium encoded with an image editing program performed by a computer causes the computer to execute a dividing step to divide an image of original data into a plurality of areas, an area specifying step to associate, for each of the plurality of areas divided, identification information for identifying an area of interest with the area of interest, an image generating step to generate an edit image by disposing, for each of the plurality of areas, a section image enclosing the area of interest onto the image of the original data and further disposing an image indicating the identification information of the area of interest in association with the section image, a transmitting step to transmit a first electronic mail with the edit image generated attached thereto, a receiving step to receive a second electronic mail transmitted back in response to the first electronic mail transmitted, an editing executing step to generate edited data by updating the original data based on an editing instruction included in the second electronic mail received in the receiving step, and an outputting step to output the edited data generated.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 1 is an overall schematic diagram illustrating a print system according to one embodiment of the present invention.

FIG. 4 is a block diagram showing one example of a hardware arrangement of a portable information device.

FIG. 7 is a diagram showing one example of a modification instruction e-mail (electronic mail) template.

FIG. 8 is a first diagram showing one example of a reply e-mail to an e-mail for editing.

FIG. 10 is a second diagram showing one example of the reply e-mail to the e-mail for editing.

FIG. 12 is a third diagram showing one example of the reply e-mail to the e-mail for editing.

FIG. 14 is a fourth diagram showing one example of the reply e-mail to the e-mail for editing.

FIG. 15 is a fourth diagram illustrating one example of the image of the edited data.

FIG. 16 is a fifth diagram showing one example of the reply e-mail to the e-mail for editing.

FIG. 17 is a second diagram illustrating one example of the edit image.

FIG. 18 is a sixth diagram showing one example of the reply e-mail to the e-mail for editing.

DESCRIPTION OF THE PREFERRED EMBODIMENTS

Figure 2:
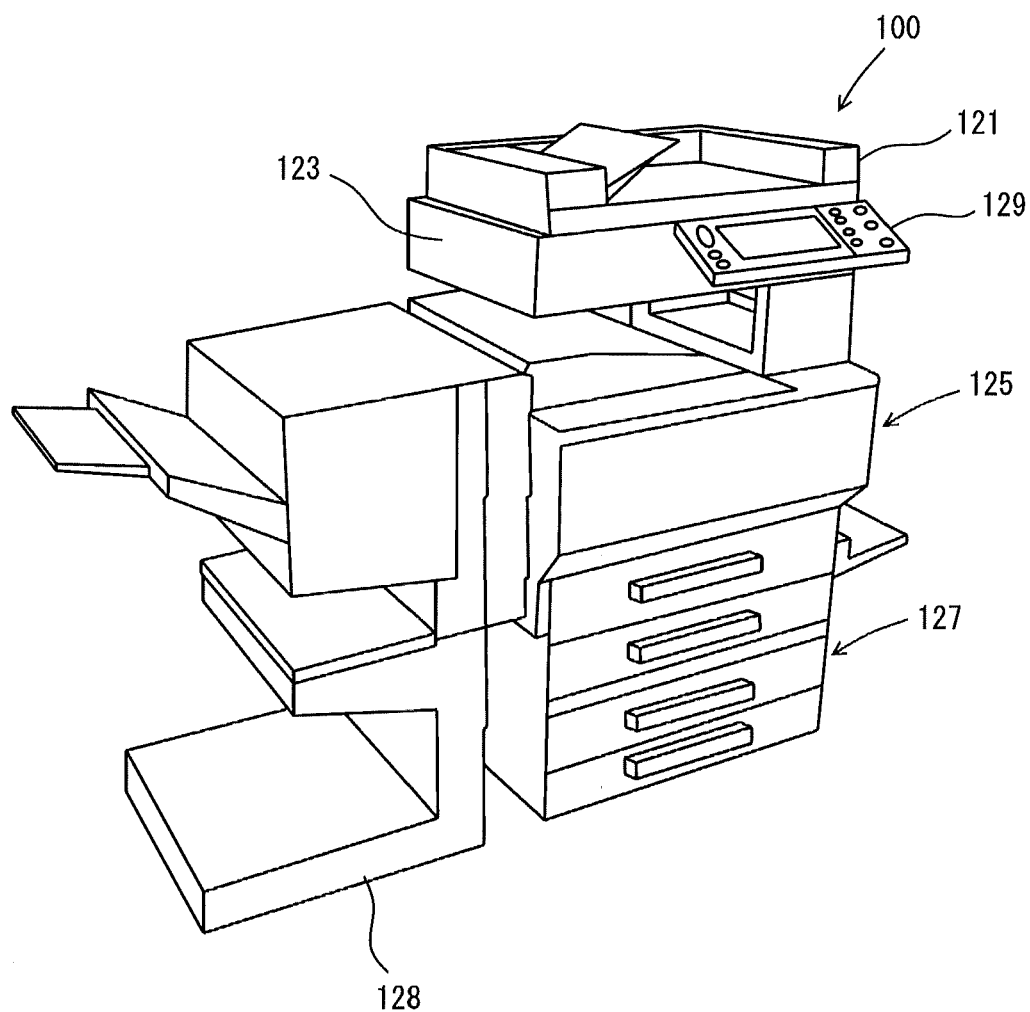
FIG. 2 is a perspective view illustrating the external appearance of an MFP.

The embodiments of the present invention will be described below with reference to the drawings. In the following description, the same or corresponding parts are denoted by the same reference characters. Their names and function are also the same. Thus, the detailed description thereof will not be repeated.

FIG. 1 is an overall schematic diagram illustrating a print system according to one embodiment of the present invention. With reference to FIG. 1, a print system 1 includes a multi function peripheral (hereinafter referred to as an MFP) 100, a personal computer (hereinafter referred to as a "PC") 300, a wireless station 5, a portable information device 200, a portable information device 200A, and a portable information device 200B. MFP (Multi Function Peripheral) 100 and PC 300 are connected to a network 3. Portable information device 200, portable information device 200A, and portable information device 200B are connected to network 3 via wireless station 5.

Network 3 is a local area network (LAN) and the form of connection may be by cable or wireless. In addition, network 3 is not limited to the LAN and may be a wide area network (WAN), Public Switched Telephone Networks (PSTN), the Internet and the like.

PC 300 is a common computer. PC 300 has a printer driver program installed therein which is compatible with MFP 100, and is capable of controlling MFP 100 by executing the printer driver program to cause MFP 100 to execute an image forming process, an original document scanning process and so on.

The hardware arrangement and the function of portable information device 200, portable information device 200A, and portable information device 200B are the same so that portable information device 200 will be described as an example here, unless mentioned otherwise.

Figure 3:
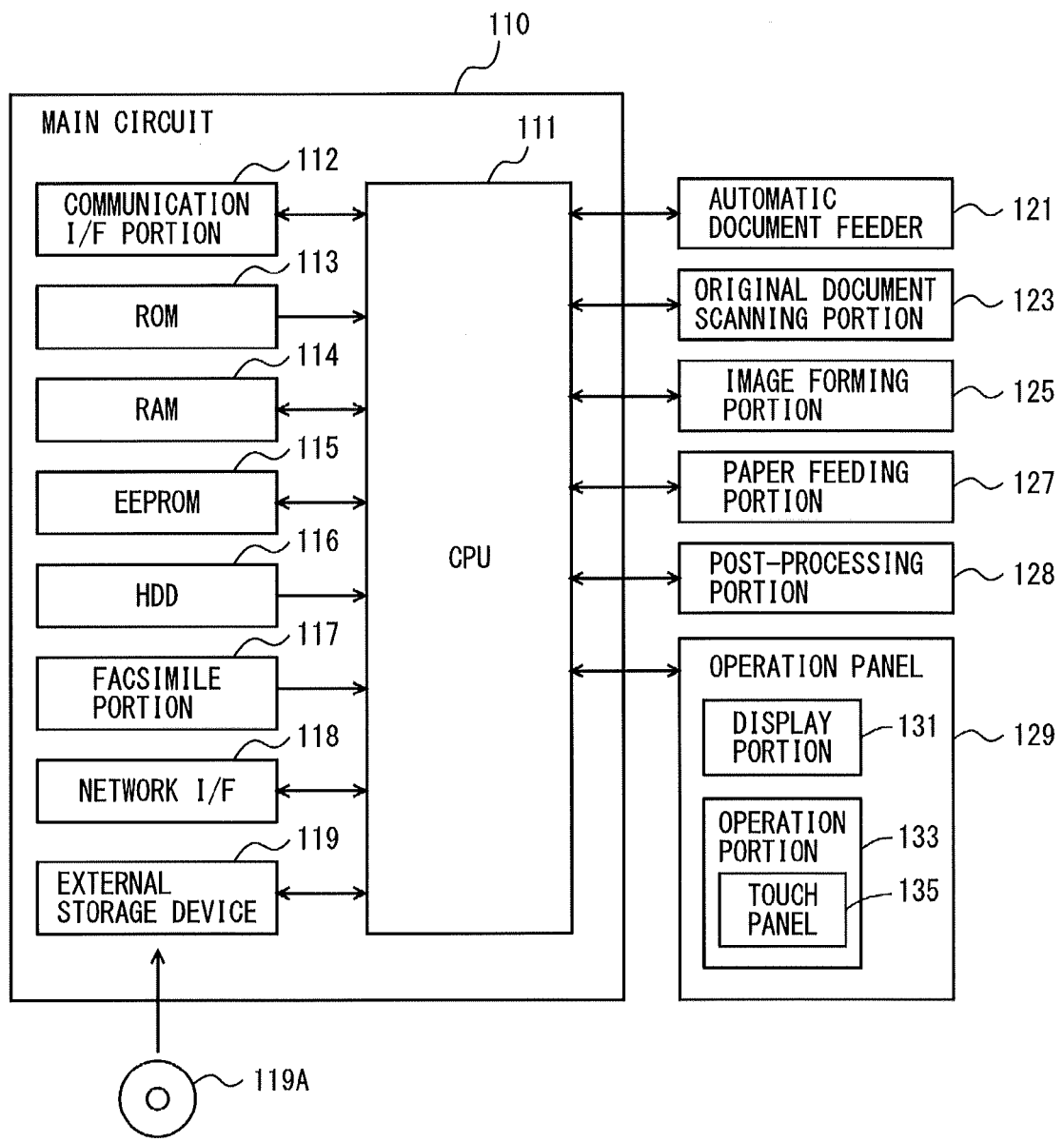
FIG. 3 is a block diagram showing one example of a hardware arrangement of the MFP.

FIG. 2 is a perspective view illustrating the external appearance of an MFP. FIG. 3 is a block diagram showing one example of a hardware arrangement of the MFP. With reference to FIGS. 2 and 3, MFP 100 includes an automatic document feeder (ADF) 121, an original document scanning portion 123, an image forming portion 125 to form an image on a sheet of paper and the like based on image data outputted by original document scanning portion 123 after it scans the sheet of an original document, a paper feeding portion 127 to supply a sheet of paper to image forming portion 125, a post-processing portion 128 to process the sheet of paper on which the image has been formed, an operation panel 129 serving as a user interface, and a main circuit 110.

ADF 121 automatically feeds a plurality of sheets of an original document being set on an original document paper feed tray one sheet at a time to a prescribed original document scanning position set on a platen glass of original document scanning portion 123, and discharges the sheet of original document onto an original document paper discharge tray after an original document image has been scanned by original document scanning portion 123. Original document scanning portion 123 includes a light source for irradiating light on the sheet of original document fed to the original document scanning position and a photoelectric transducer for receiving the light reflected from the sheet of original document, and scans the original document image according to the size of the sheet of original document. The photoelectric transducer converts the received light into image data as an electrical signal and outputs it to image forming portion 125. Paper feeding portion 127 feeds a sheet of paper stored in the paper feed tray to image forming portion 125.

Image forming portion 125 forms an image by a well-known electrophotographic method, and forms the image on the sheet of paper fed by paper feeding portion 127 based on image data after data processing obtained by applying a variety of data processing such as shading correction to the image data inputted from original document scanning portion 123 or to image data received from outside.

Post-processing portion 128 discharges the sheet of paper on which the image is formed. Post-processing portion 128 has a plurality of paper discharge trays and is able to sort and discharge the sheets of paper on which images are formed. Moreover, post-processing portion 128 is provided with a hole-punching process portion and a stapling process portion and is capable of applying a hole-punching process or a stapling process to the discharged sheet of paper. In addition, on its top surface, MFP 100 is provided with operation panel 129 serving as a user interface with a user.

Main circuit 110 includes a CPU 111, a communication interface (I/F) portion 112, a ROM (Read Only Memory) 113, a RAM (Random Access Memory) 114, an EEPROM (Electrically Erasable and Programmable ROM) 115, a hard disk drive (HDD) 116 serving as a mass storage device, a facsimile portion 117, a network interface (I/F) 118, and an external storage device 119 having a CD (Compact Disk)-ROM 119A mounted thereto. CPU 111 is connected to automatic document feeder 121, original document scanning portion 123, image forming portion 125, paper feeding portion 127, post-processing portion 128, and operation panel 129 and controls the entire MFP 100.

ROM 113 stores a program to be executed by CPU 111 or the data necessary for execution of that program. RAM 114 is used as a work area when CPU 111 executes a program. In addition, RAM 114 temporarily stores the scanned data (image data) sent continuously from original document scanning portion 123.

Operation panel 129 is provided on a top surface of MFP 100. Operation panel 129 includes a display portion 131 and an operation portion 133. Display portion 131 is a display such as an LCD (Liquid Crystal Display) and an organic ELD (Electro-Luminescence Display), and displays an instruction menu for a user, information related to the image data obtained, and so on. Operation portion 133 is provided with a plurality of keys and accepts the input of data such as a number, a character, and a variety of instructions by user operation corresponding to the keys. Operation portion 133 further includes a touch panel 135 to detect a position on a display surface of display portion 131. Touch panel 135 is provided on a top surface or a bottom surface of display portion 131 and outputs to CPU 111 the coordinates of a position indicated by the user.

Communication I/F portion 112 is an interface for connecting MFP 100 to an external device. Network I/F 118 is an interface for connecting MFP 100 to network 3. CPU 111 communicates with PC 300, portable information device 200, portable information device 200A, and portable information device 200B connected to network 3 via network I/F 118 and transmits and receives data. In addition, network I/F 118 is capable of communicating with a computer connected to the Internet via network 3.

Facsimile portion 117 is connected to Public Switched Telephone Networks (PSTN) and transmits and receives facsimile data. Facsimile portion 117 converts the image data scanned by original document scanning portion 123 or the data stored in HDD 116 into facsimile data and transmits the converted data to a facsimile device connected to the PSTN. In addition, facsimile portion 117 stores the received facsimile data in HDD 116 or causes image forming portion 125 to form the image of the facsimile data on a sheet of paper.

External storage device 119 has CD-ROM 119A mounted thereto. CPU 111 is capable of accessing CD-ROM 119A via external storage device 119. CPU 111 loads into RAM 114 a program recorded in CD-ROM 119A mounted on external storage device 119 and executes it. Moreover, the program to be executed by CPU 111 is not limited to the program recorded in CD-ROM 119A, and a program stored in HDD 116 may be loaded into RAM 114 and be executed. In this case, another computer connected to network 3 may rewrite the program stored in HDD 116 of MFP 100 or it may additionally write in a new program. Furthermore, MFP 100 may download a program from another computer connected to network 3 and store this program in HDD 116. The program referred to here includes not only a program directly executable by CPU 111 but also a source program, a compressed program, an encrypted program, and the like.

FIG. 4 is a functional block diagram showing an overall hardware arrangement of a portable information device. With reference to FIG. 4, portable information device 200 includes a CPU 201 for controlling the entire portable information device 200, a camera 202, a flash memory 203 to store data in a non-volatile manner, a wireless communication portion 204 being connected to a call portion 205, a display portion 206 to display an image, and an operation portion 207 to accept the input of an operation by a user. CPU 201, camera 202, flash memory 203, wireless communication portion 204, and display portion 206 are connected via a bus 208.

Wireless communication portion 204 communicates by wireless with a base station for mobile phones connected to a telephone communication network. Wireless communication portion 204 connects portable information device 200 to the telephone communication network and allows calling using call portion 205. Wireless communication portion 204 decodes the audio signal derived by demodulating the radio signal received from the base station for mobile phones and outputs the decoded signal to call portion 205. In addition, wireless communication portion 204 encodes the voice inputted from call portion 205 and transmits the encoded voice to the base station for mobile phones. Call portion 205 is provided with a microphone and a speaker, and outputs the voice inputted from wireless communication portion 204 from the speaker and outputs the voice inputted from the microphone to wireless communication portion 204. Furthermore, wireless communication portion 204 is controlled by CPU 201 to connect portable information device 200 to an electronic mail server and to transmit and receive an electronic mail.

Camera 202 is provided with a photoelectric transducer such as a CMOS (Complementary Metal Oxide Semiconductor) sensor and a lens, and the light focused by the lens forms an image in the CMOS sensor and the CMOS sensor causes the received light to undergo a photoelectric transfer, and image data is outputted to CPU 201. Moreover, a CCD (Charge Coupled Devices) sensor may be used in place of the CMOS sensor.

Display portion 206 is a display device such as a liquid crystal display (LCD) and an organic ELD, and displays an instruction menu for a user, information related to the image data obtained, and so on. Operation portion 207 is provided with a plurality of keys and a touch panel. Operation portion 207 accepts the input of data such as a number, a character, and a variety of instructions by user operation corresponding to a plurality of keys. In addition, when the user instructs on a display surface of display portion 206, operation portion 207 outputs the position on the display surface detected by the touch panel to CPU 201. Based on the position detected by the touch panel, CPU 201 detects the position indicated by the user within the screen being displayed on display portion 206.

Figure 5:
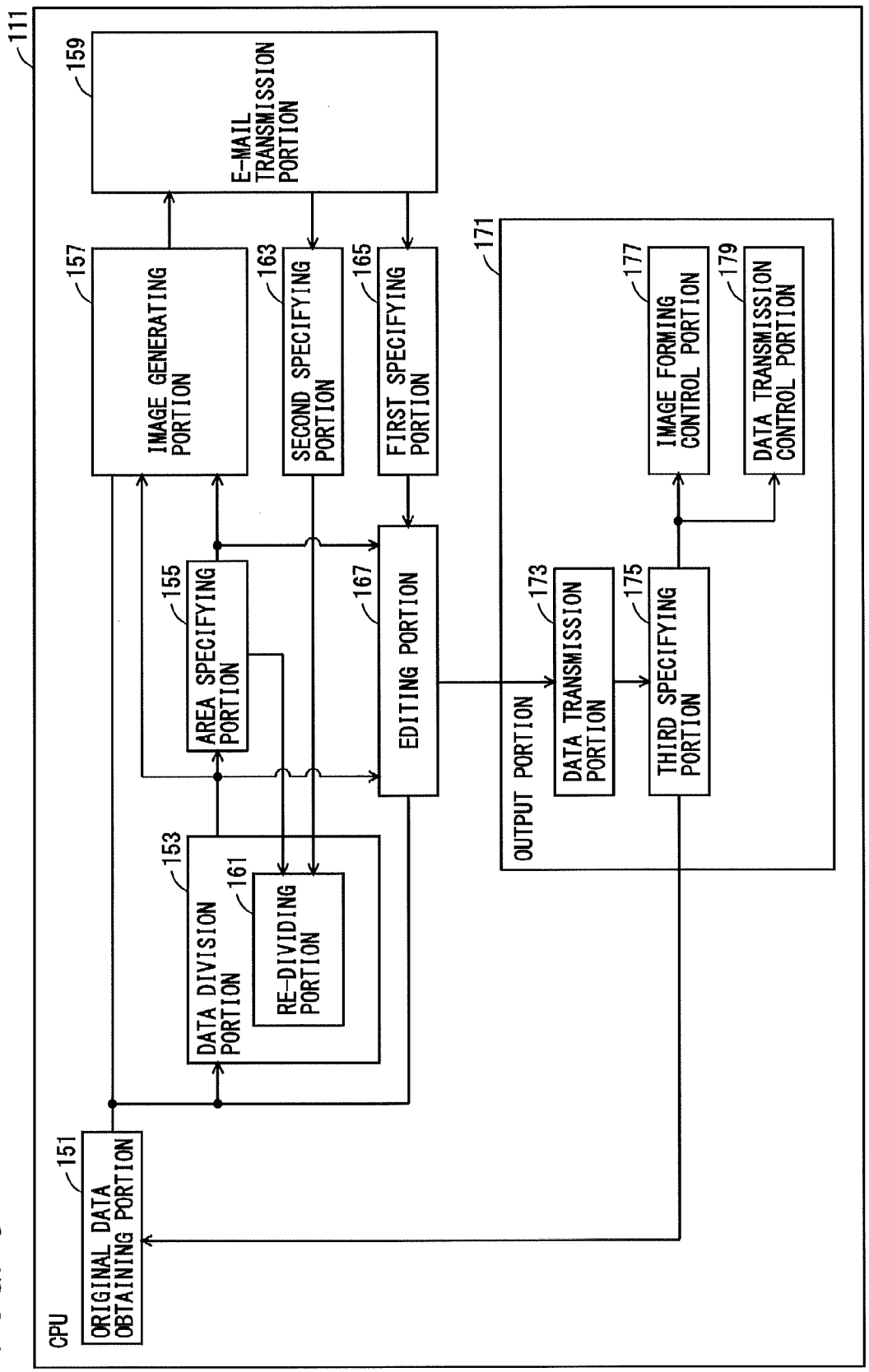
FIG. 5 is a block diagram showing one example of a function of a CPU (Central Processing Unit) provided in the MFP.

FIG. 5 is a block diagram showing one example of a function of a CPU provided in the MFP. The function shown in FIG. 5 is the function formed in CPU 111 provided in MFP 100 by CPU 111 executing an image editing program stored in ROM 113, EEPROM 115, HDD 116, or CD-ROM 119A. With reference to FIG. 5, CPU 111 includes an original data obtaining portion 151, a data division portion 153, an area specifying portion 155, an image generating portion 157, an e-mail transmission portion 159, a second specifying portion 163, a first specifying portion 165, an editing portion 167, and an output portion 171. Output portion 171 includes a data transmission portion 173, a third specifying portion 175, an image forming control portion 177, and a data transmission control portion 179.

Original data obtaining portion 151 obtains original data. The original data is the data to be the target of editing by a user, and is determined by being designated by the user. The original data includes the data stored in HDD 116, the image data outputted by original document scanning portion 123 after it scans the sheet of an original document, the data received by network I/F 118 from PC 300, the data stored in CD-ROM 119A mounted on external storage device 119, and the facsimile data received by facsimile portion 117. The data received from PC 300 includes print data which becomes the basis for image forming by image forming portion 125.

In the case where the user operating portable information device 200 operates MFP 100 by remote control using portable information device 200, if the user designates the original data via portable information device 200, original data obtaining portion 151 obtains the original data designated by the user. In addition, when the user operates operation panel 129 of MFP 100, original data obtaining portion 151 obtains the original data designated by the user if the user designates the original data using operation panel 129.

Here, the case will be described in which original data obtaining portion 151 obtains print data as the original data. When the print data is received from PC 300 and an image of the print data is to be formed, MFP 100 stores history information including the print data. When the user operates MFP 100 using operation panel 129 or operates MFP 100 by remote control using portable information device 200 and designates the history information, original data obtaining portion 151 obtains the print data included in the designated history information.

Moreover, after MFP 100 has formed an image of the print data, a sheet of paper having the image of the print data formed thereon would exist. In the case where the user takes a photograph of the image formed on that sheet of paper with camera 202 of portable information device 200 and transmits the image data obtained by the photograph taking to MFP 100, original data obtaining portion 151 obtains as original data the print data of the image which is identical or similar to the image data received. In this case, the original data can be specified sooner if original data obtaining portion 151 starts selecting among the history information in order from the history information having the most recent time of image forming and compares the image of the received image data with the image of the print data included in the selected history information.

Original data obtaining portion 151 inputs the obtained original data to data division portion 153. In the following description, the case where the user operates portable information device 200 to designate the original data will be described as an example.

Data division portion 153 divides the image of the original data inputted from original data obtaining portion 151 into a plurality of areas. Data division portion 153 outputs a plurality of area information respectively indicating the plurality of areas divided to area specifying portion 155 and image generating portion 157. The area information indicates the position of an area within the image of the original data. Thus, a plurality of area information correspond to a single original data.

Data division portion 153 divides the image of the original data based on a property of the image. The properties of the image include an area of a character property representing a character, an area of a graphic form property representing a graphic form, and an area of a photograph property representing a photograph. As for the area of the character property, data division portion 153 divides it further based on the layout of a document. The layout of the document is the arrangement of parts such as a title, a body text, a caption, a header, a footer, and a signature. Furthermore, as for the part of the body text in the area of the character property, data division portion 153 may segmentize it paragraph by paragraph. The beginning of a paragraph may be determined by the presence or absence of a space at a line head.

For instance, data division portion 153 first extracts the part other than the background of the image of the original data. Since the area of the background is uniform in color, the area having a uniform color would be determined as the area of the background, and the part other than that is extracted as a rectangular area. At this stage, one or more rectangular areas are extracted. Then, each of one or more rectangular areas extracted is segmentized into rectangular areas by the property of the image. Further, the area of the character property is divided further based on the layout of the document. In order to divide the area of the character property based on the layout, for instance, the following positions within the document may be utilized:

(1) Headers and footers, which are disposed in the same positions over a plurality of pages. Headers are disposed in the upper portion and footers are disposed in the lower portion. Moreover, headers or footers sometimes include a date or a page number and the positions at which the numbers are disposed are the same over a plurality of pages;

(2) A caption, which is disposed below or above a graphic form or a photograph;

(3) A title, whose character size may be larger than other characters; and (4) An autograph or a signature, which is sometimes stated in a header portion of the original data.

Moreover, a well-known technique may be used as the technique to divide the area of the character property into a plurality of parts based on the layout.

Area specifying portion 155 receives the input of a plurality of area information from data division portion 153 and gives to each of a plurality of areas respectively specified by the plurality of area information, area identification information for identifying the area of interest. The plurality of area information correspond to the original data so that the plurality of area identification information given respectively to the plurality of areas also correspond to the original data. In other words, area specifying portion 155 associates area information with area identification information for each of the plurality of areas. The area identification information only needs to specify one of a plurality of areas, and it may be a sequential number, or a name of arrayed characters, or a symbol, or an image. Here, the area identification information is to be a sequential number. Area specifying portion 155 outputs the area information and the area identification information as a set to image generating portion 157, editing portion 167, and data division portion 153.

Image generating portion 157 receives the input of a plurality of area information from data division portion 153 and receives the input of the set of the area information and the area identification information from area specifying portion 155. Based on the plurality of area information, for each of a plurality of areas whose positions are specified by the respective plurality of area information, image generating portion 157 disposes a section image enclosing the area of interest onto the image of the original data. Furthermore, based on the set of the area information and the area identification information, image generating portion 157 disposes an image of the area identification information in association with the section image disposed at the position enclosing the area specified by the area information. For instance, the image of the area identification information is disposed in the vicinity of the section image.

Hereinafter, the image in which a section image enclosing an area of interest and the area identification information are disposed by image generating portion 157 onto the image of the original data for each of a plurality of areas whose positions are specified by the respective plurality of area information will be referred to as an edit image. Image generating portion 157 outputs the generated edit image to e-mail transmission portion 159. The edit image is the image in which a plurality of section images and a plurality of area identification information are combined with the image of the original data so that it corresponds to the original data.

E-mail transmission portion 159 receives the input of the edit image from image generating portion 157. E-mail transmission portion 159 generates and transmits an e-mail for editing which sets as a destination the electronic mail address of the user who designated the original data. The e-mail for editing includes the edit image inputted from image generating portion 157 and a modification instruction e-mail template. The edit image is set as an attachment file of the e-mail for editing. The modification instruction e-mail template is set in the body text portion of the e-mail for editing. While the details of the modification instruction e-mail template will be described later, it includes support information indicating a method of inputting a modification instruction, an area for inputting the area identification information of the area to be the target of editing, and an area for inputting a command for the area to be the target of editing.

In addition, e-mail transmission portion 159 outputs as a set a header portion of the e-mail for editing transmitted and a file name of the original data to second specifying portion 163 and first specifying portion 165. This is to specify the original data and the e-mail for editing corresponding to a reply e-mail when such a reply e-mail corresponding to the e-mail for editing is received. Here, the case where the user who designated the original data operates portable information device 200 to receive the e-mail for editing will be described as an example.

When portable information device 200 receives an e-mail for editing, it becomes possible for the user of portable information device 200 to view the edit image and the modification instruction e-mail template included in the e-mail for editing received. The user is able to input a modification instruction into MFP 100 by referring to the modification instruction e-mail template, the image of the area identification information, and the section image within the edit image, and generating and transmitting a reply e-mail corresponding to the e-mail for editing.

The modification instruction includes a command and a parameter. The command includes an editing instruction command and a configuration alteration instruction command. The editing instruction command specifies the process to alter the original data and includes deletion, moving, addition, and substitution. The configuration alteration instruction command specifies the process to alter the plurality of areas into which the original data is to be divided and includes division and combination. The parameter indicates the target of the execution of the process specified by the command.

More specifically, the editing instruction command "deletion" indicates the process of deleting a target portion from the original data. As the parameter, the area identification information specifying the target portion is set. The editing instruction command "moving" indicates the process of altering the position within the original data of a target portion of the original data. The parameters include the area identification information specifying the target portion and the information to specify the position after the alteration. Here, the information to specify the position after the alteration includes the area identification information and the relative positional relationship with the area specified by that area identification information. The editing instruction command "addition" indicates the process of adding another data to the original data. The parameters include the information specifying the data to be added and the information to specify the position to add the data within the original data. Here, the information to specify the position to add the data within the original data includes the area identification information and the relative positional relationship with the area specified by that area identification information. The editing instruction command "substitution" indicates the process of substituting a target portion of the original data with another data. The parameters include the information specifying the new data and the area identification information to specify the area to be the target of substitution within the original data.

The configuration alteration instruction command "division" indicates the process of dividing a target portion of the original data into a plurality of target portions. The parameter includes the area identification information. The configuration alteration instruction command "combination" indicates the process of combining a plurality of target portions of the original data into one target portion. The parameter includes the area identification information.

The modification instruction e-mail template includes the support information indicating a method of inputting a modification instruction, an area for inputting the identification information of the area to be the target of editing, and an area for inputting a command for the area to be the target of editing. Thus, in the reply e-mail to the e-mail for editing, a modification instruction can be easily inputted by editing the modification instruction e-mail template. More specifically, an editing instruction command or a configuration alteration instruction command should be inputted into the area for inputting the command in the modification instruction e-mail template, and a parameter should be inputted into the area for inputting the identification information of the area to be the target of editing. The support information would indicate the method of inputting the modification instruction so that the parameter and the command as the modification instruction can be easily inputted.

First specifying portion 165 and second specifying portion 163 receive via network I/F 118 the reply e-mail in which the modification instruction is stated by the user from portable information device 200 operated by the user of the destination of the e-mail for editing.

First specifying portion 165 extracts the header portion of the reply e-mail received, and specifies the e-mail for editing corresponding to the reply e-mail, based on the header portion of the e-mail for editing inputted from e-mail transmission portion 159 and the header portion extracted from the reply e-mail. Then, the original data of the file name which forms a set with the header portion of the specified e-mail for editing is specified. First specifying portion 165 analyzes the modification instruction e-mail template of the received reply e-mail and extracts an editing instruction command and a parameter. More specifically, first specifying portion 165 specifies the command described in the area for inputting a command within the modification instruction e-mail template, and, if the specified command is an editing instruction command, outputs that editing instruction command, the parameter described in the area for inputting the identification information of the area to be the target of editing, and the file name of the original data to editing portion 167.

Editing portion 167 receives the input of the file name of the original data, the editing instruction command, and the parameter from first specifying portion 165. Based on the editing instruction command and the parameter inputted, editing portion 167 generates edited data by editing the original data specified by the inputted file name. The edited data is the data obtained by partially altering the original data. Editing portion 167 outputs the generated edited data to data transmission portion 173.

More specifically, in the case where the editing instruction command is "deletion," the area identification information of the area to be the target of deletion is set as the parameter. Editing portion 167 deletes from the original data the area within the original data specified by the area identification information which is the parameter. In the case where the editing instruction command is "moving," the parameters include the area identification information of the area to be the target of the move, the area identification information of the area of the destination of the move or the moving destination, and the information indicating the relative position in relation to the area of the moving destination. Editing portion 167 moves the area specified by the area identification information of the area to be the target of the move within the original data to the position specified by the information indicating the relative position in relation to the area specified by the area identification information of the area of the moving destination within the original data. In the case where the editing instruction command is "addition," the parameter includes data identification information to specify new data, and, for the purpose of specifying the position to add the data, the area identification information of an area and the information indicating the relative position in relation to that area. Editing portion 167 adds the data specified by the data identification information to the position specified by the information indicating the relative position in relation to the area specified by the area identification information within the original data. In the case where the editing instruction command is "substitution," the parameter includes the data identification information to specify the new data and the area identification information of the area to be the target of substitution. Editing portion 167 substitutes the data specified by the data identification information for the area specified by the area identification information within the original data.

Data transmission portion 173 receives the input of edited data from editing portion 167. Data transmission portion 173 generates and transmits a confirmation electronic mail which sets the electronic mail address of the user who designated the original data as a destination and which includes the inputted edited data. The confirmation electronic mail includes the edited data inputted from editing portion 167 and a confirmation e-mail template. The edited data is set as an attachment file of the confirmation electronic mail as data for confirmation. The confirmation e-mail template is set in the body text portion of the confirmation electronic mail. The confirmation e-mail template includes an area for inputting the content of a response and an area for inputting an output method. The confirmation e-mail template includes a description explaining the method of confirmation in relation to the area for inputting the content of the response, and a description explaining the output method in relation to the area for inputting the output method.

When portable information device 200 receives a confirmation electronic mail, it becomes possible for the user of portable information device 200 to view the image of the data for confirmation and the confirmation e-mail template included in the confirmation electronic mail received. The user is able to input a confirmation result into MFP 100 by referring to the image of the data for confirmation and generating and transmitting a reply e-mail corresponding to the confirmation electronic mail.

The confirmation result includes the decision whether to approve or not approve the data for confirmation and, if it is to be approved, the designation of the output method. More specifically, the confirmation e-mail template includes the support information indicating a method of inputting the confirmation result, an area for inputting the confirmation result, the support information indicating a method of designating the output method, and an area for inputting the output method. Thus, in the reply e-mail to the confirmation electronic mail, the confirmation result can be easily inputted by editing the confirmation e-mail template. More specifically, the decision whether to approve or not approve the data for confirmation should be inputted into the area for inputting the confirmation result in the confirmation e-mail template and, if it is to be approved, the output method should be inputted into the area for inputting the output method. With the support information indicating the method of inputting the confirmation result and the support information indicating the method of designating the output method, the user is able to input the confirmation result and the output method with ease.

Third specifying portion 175 controls network I/F 118 to receive a reply e-mail from portable information device 200 operated by the user of the destination of the confirmation electronic mail. If the decision to approve the data for confirmation is stated in the area for inputting the confirmation result in the confirmation e-mail template of the reply e-mail received, third specifying portion 175 outputs an output instruction to image forming control portion 177 or to data transmission control portion 179.

If the decision not to approve the data for confirmation is stated in the area for inputting the confirmation result in the confirmation e-mail template of the reply e-mail received, third specifying portion 175 outputs the edited data to original data obtaining portion 151. When the edited data is inputted from third specifying portion 175, original data obtaining portion 151 obtains the edited data as new original data. In the case where a command instructing image forming is set in the area for inputting the output method in the confirmation e-mail template of the reply e-mail received, third specifying portion 175 outputs an instruction to form the image of the edited data to image forming control portion 177. Image forming control portion 177 controls image forming portion 125 to form the image of the edited data. In addition, in the case where a command for data transmission is set in the area for inputting the output method in the confirmation e-mail template of the reply e-mail received, third specifying portion 175 outputs an instruction of transmission of the edited data to data transmission control portion 179. Data transmission control portion 179 controls network I/F 118 to transmit the edited data to a transmission destination being designated in advance as the transmission destination. The transmission destination designated in advance as the transmission destination may be an attendant of a conference, for instance. Moreover, the information of the transmission destination may be included along with the command for data transmission in the reply e-mail.

Second specifying portion 163 extracts the header portion of the reply e-mail received, and specifies the e-mail for editing corresponding to the reply e-mail, based on the header portion of the e-mail for editing inputted from e-mail transmission portion 159 and the header portion extracted from the reply e-mail. Then, the original data of the file name which forms a set with the header portion of the specified e-mail for editing is specified.

Second specifying portion 163 analyzes the modification instruction e-mail template of the received reply e-mail and extracts a configuration alteration instruction command and a parameter. More specifically, second specifying portion 163 specifies the command described in the area for inputting a command within the modification instruction e-mail template, and, if the specified command is a configuration alteration instruction command, outputs that configuration alteration instruction command, the parameter described in the area for inputting the identification information of the area to be the target of editing, and the file name of the original data to a re-dividing portion 161.

Re-dividing portion 161 receives the input of the file name of the original data, the configuration alteration instruction command, and the parameter from first specifying portion 165 and receives the input of a set of the area information and the area identification information from area specifying portion 155. According to the configuration alteration instruction command, re-dividing portion 161 re-divides the original data specified by the file name inputted from first specifying portion 165. More specifically, among a plurality of areas specified by the area information of the original data, an area specified by the parameter is divided or combined according to the configuration alteration instruction command, thereby reconfiguring a plurality of areas specified by the area information.

More specifically, if the configuration alteration instruction command is "division," re-dividing portion 161 extracts the set including the area identification information specified by the parameter from among the sets of the area information and the area identification information inputted from area specifying portion 155 and obtains the area information. Re-dividing portion 161 divides the area within the original data indicated by the area information obtained. As the method for dividing the area, the well-known method described above may be used. Then, re-dividing portion 161 outputs to area specifying portion 155 and image generating portion 157 the area information included in a set other than the set including the area identification information specified by the parameter among the sets of the area information and the area identification information inputted from area specifying portion 155 and the area information respectively indicating a plurality of areas into which the area indicated by the area information included in the set including the area identification information specified by the parameter is divided.

In addition, if the configuration alteration instruction command is "combination," re-dividing portion 161 extracts a set including a plurality of area identification information specified by the parameter from among the sets of the area information and the area identification information inputted from area specifying portion 155 and obtains a plurality of area information. Then, re-dividing portion 161 combines the plurality of areas respectively indicated by a plurality of area information obtained within the original data into one area. Re-dividing portion 161 outputs to area specifying portion 155 and image generating portion 157 the area information included in a set other than a plurality of sets respectively including a plurality of area identification information specified by the parameter among the sets of the area information and the area identification information inputted from area specifying portion 155 and the area information indicating one area into which a plurality of areas indicated by a plurality of area information included in a plurality of sets respectively including a plurality of area identification information specified by the parameter are combined.

Area specifying portion 155 and image generating portion 157 give the area identification information and generate an edit image based on a plurality of new area information inputted from re-dividing portion 161.

Figure 6:
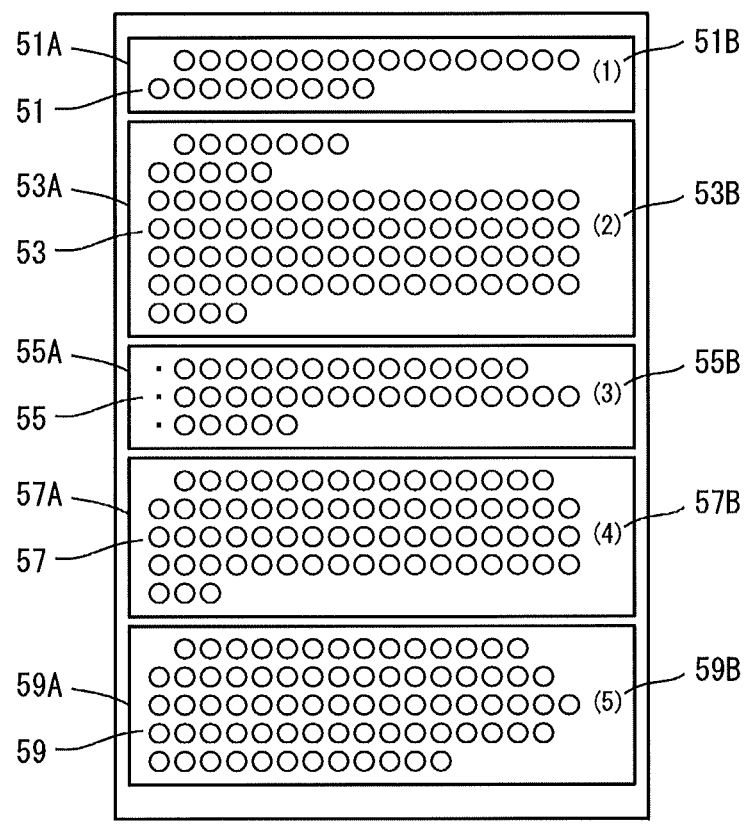
FIG. 6 is a first diagram illustrating one example of an edit image.

FIG. 6 is a first diagram illustrating one example of an edit image. With reference to FIG. 6, the case is shown where an edit image 50 is generated from the original data including a document consisting of five paragraphs. Edit image 50 includes a section image 51A, a section image 53A, a section image 55A, a section image 57A, and a section image 59A, and an image of area identification information or an area identification information image 51B, an area identification information image 53B, an area identification information image 55B, an area identification information image 57B, and an area identification information image 59B respectively corresponding to five areas of an area 51, an area 53, an area 55, an area 57, and an area 59 of the five respective paragraphs included in the original data. Section image 51A, section image 53A, section image 55A, section image 57A, and section image 59A respectively are rectangular images enclosing the corresponding areas of area 51, area 53, area 55, area 57, and area 59. Area identification information image 51B, area identification information image 53B, area identification information image 55B, area identification information image 57B, and area identification information image 59B are respectively disposed inside of and associated with the corresponding section images of section image 51A, section image 53A, section image 55A, section image 57A, and section image 59A.

FIG. 7 is a diagram showing one example of a modification instruction e-mail template. With reference to FIG. 7, a modification instruction e-mail template 70 includes support information 71 and an area 73 for inputting a command for the area to be the target of editing, following the title of "1. Command Designation." Support information 71 includes the message of "Please designate one of deletion, moving, addition, substitution, division, and combination as a modification instruction" which allows the user to know that one of "deletion," "moving," "addition," "substitution," "division," and "combination" can be designated as a command.

On the left side of area 73 for inputting a command, the message of "Designation Command:" is disposed, which allows the user to know area 73 for inputting the command.

Further, modification instruction e-mail template 70 includes support information 75 and an area 77 for inputting a parameter following the title of "2. Modification Target Number." In area 77, the area identification information of the area to be the target of editing is set. Support information 75 includes the message of "For deletion, moving, addition, substitution, or division, please designate the number on the attachment image of this e-mail" which allows the user to understand that it is the area identification information of the area which needs to be set as the parameter in relation to the command inputted in area 73. More specifically, the message of "For addition or substitution, please state 'attachment' when designating a file to be attached to the reply e-mail," the message of "For combination, please make sure to designate multiple numbers" and the message of "For substitution, one number or multiple numbers may be designated" are included.

On the left side of area 77 for inputting the area identification information of an area, the message of "Modification Target Number:" is disposed, which allows the user to know area 77 for inputting the identification information of the area.

In addition, support information 79 and an area 81 and an area 83 for inputting the parameters are included following the title of "3. Moving/Addition Destination Number." Support information 79 includes the message of "For moving, addition, or substitution, please designate the number of a moving destination, addition destination, or substitution destination on the image attached to this e-mail" and the message of "Please designate which side of the designation number it is by above, below, left, or right," which allow the user to know the information that need to be set as the parameters in relation to the command inputted in area 73.

On the left side of area 81, the message of "Moving/Addition/Substitution Destination Number:" is disposed, which allows the user to know area 81 for inputting the area identification information of the area of moving, or addition or substitution destination. Furthermore, on the left side of area 83, the message of "Which Side:" is disposed, and one of "Above," "Below," "Left," and "Right" can be set in area 83. Area 83 allows the user to know that the position within the original data to dispose the data attached to the reply e-mail or the area specified by the area identification information set in area 77 can be set by the relative position with respect to the area of the area identification information set in area 81.

The reply e-mail for the e-mail for editing including edit image 50 shown in FIG. 6 and the edited data to be generated according to the reply e-mail will be described below. Moreover, the reply e-mail to the e-mail for editing includes modification instruction e-mail template 70 shown in FIG. 7 and is shown with the command and the parameter added. FIG. 8 is a first diagram showing one example of a reply e-mail to an e-mail for editing. With reference to FIG. 8, a modification instruction e-mail template 70A included in a reply e-mail to an e-mail for editing has "Deletion" set in area 73 for inputting a command, and has the area identification information "5" as the parameter set in area 77 for inputting a parameter. Thus, the reply e-mail indicates the instruction of the modification to delete from the original data the portion corresponding to area 59 specified by the area identification information "5" of edit image 50 among the five areas included in the original data.

Figure 9:
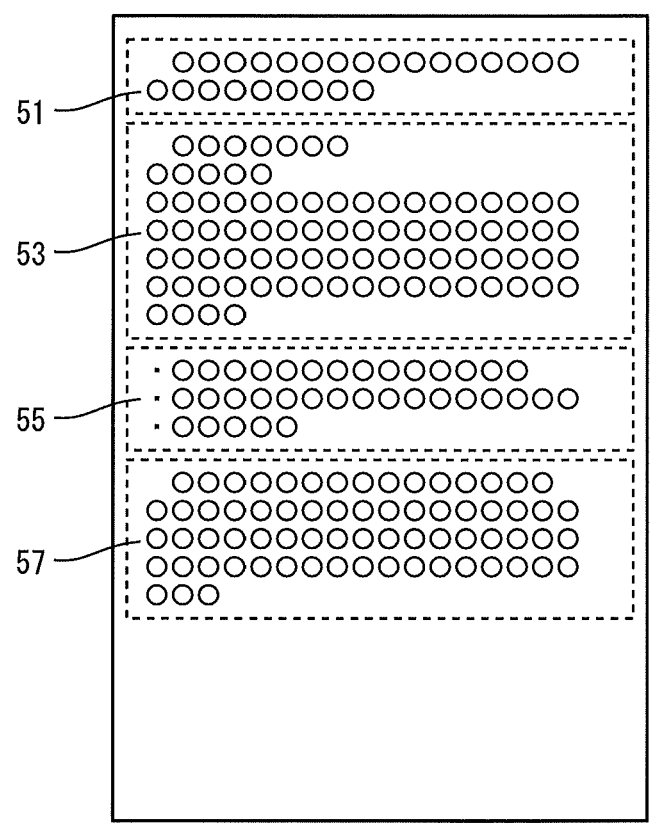
FIG. 9 is a first diagram illustrating one example of an image of edited data.

FIG. 9 is a first diagram illustrating one example of an image of edited data. The edited data shown in FIG. 9 shows the image of the edited data obtained by editing the original data after the reply e-mail shown in FIG. 8 was received. With reference to FIG. 9, it differs from edit image 50 shown in FIG. 6 in that area 59 has been deleted. Moreover, the dashed lines within the drawing are added for convenience to indicate area 51, area 53, area 55, and area 57 and do not actually exist.

FIG. 10 is a second diagram showing one example of the reply e-mail to the e-mail for editing. With reference to FIG. 10, a modification instruction e-mail template 70B included in the reply e-mail to the e-mail for editing has "Moving" set in area 73 for inputting a command, and has the area identification information "5" as the parameter set in area 77 for inputting a parameter. Furthermore, the area identification information "4" and a relative position "Above" are respectively set in area 81 and area 83 for inputting the parameters. Thus, the reply e-mail indicates the instruction of the modification to move the portion corresponding to area 59 specified by the area identification information "5" of edit image 50 among the five areas included in the original data to a position above area 57 specified by the area identification information "4" of edit image 50.

Figure 11:
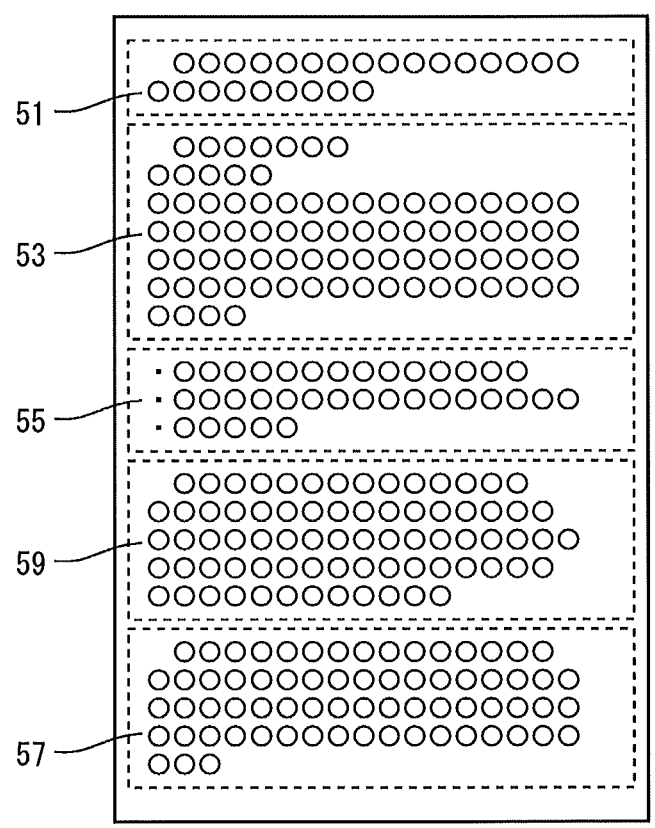
FIG. 11 is a second diagram illustrating one example of the image of the edited data.

FIG. 11 is a second diagram illustrating one example of the image of the edited data. The edited data shown in FIG. 11 shows the image of the edited data obtained by editing the original data after the reply e-mail shown in FIG. 10 was received. With reference to FIG. 11, it differs from edit image 50 shown in FIG. 6 in that the order of arrangement of area 57 and area 59 is reversed. Moreover, the dashed lines within the drawing are added for convenience to indicate area 51, area 53, area 55, area 57, and area 59 and do not actually exist.

FIG. 12 is a third diagram showing one example of the reply e-mail to the e-mail for editing. With reference to FIG. 12, a modification instruction e-mail template 70C included in the reply e-mail to the e-mail for editing has "Addition" set in area 73 for inputting a command, has "Attachment" set in area 77 for inputting a parameter, and has the area identification information "4" and a relative position "Right" respectively set in area 81 and area 83 for setting the parameters. Thus, the reply e-mail indicates the instruction of the modification to dispose the data attached to the reply e-mail on the right side of area 57 specified by the area identification information "4" of edit image 50 among the five areas included in the original data.

Figure 13:
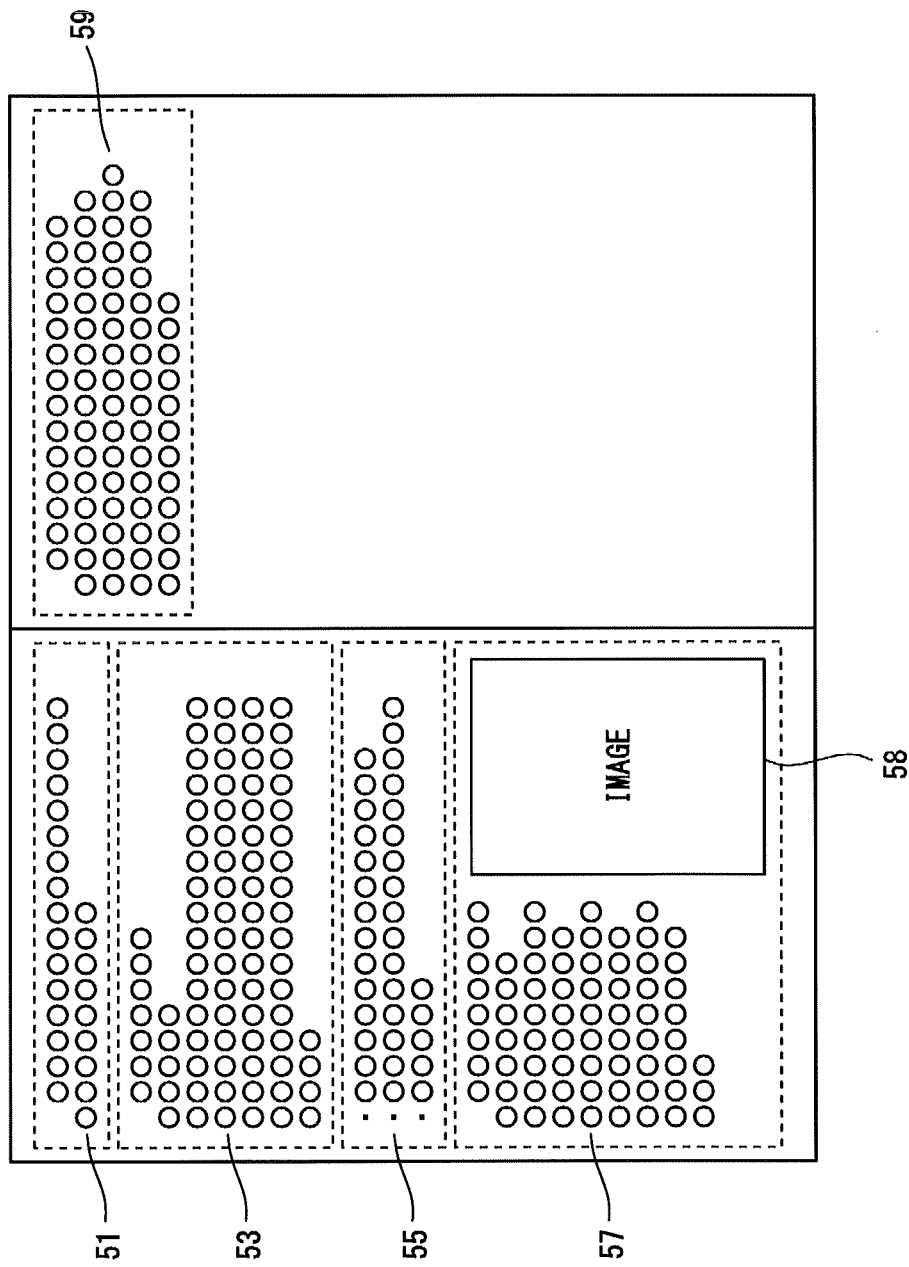
FIG. 13 is a third diagram illustrating one example of the image of the edited data.

FIG. 13 is a third diagram illustrating one example of the image of the edited data. The edited data shown in FIG. 13 shows the image of the edited data obtained by editing the original data after the reply e-mail shown in FIG. 12 was received. With reference to FIG. 13, it differs from edit image 50 shown in FIG. 6 in that the shape of area 57 has been altered, that an image 58 of the data attached to the reply e-mail has been disposed on the right side of area 57, and that area 59 is disposed on the next page. The shape of area 57 is shortened in a lateral direction and lengthened in a longitudinal direction. Moreover, the dashed lines within the drawing are added for convenience to indicate area 51, area 53, area 55, area 57, and area 59 and do not actually exist.

FIG. 14 is a fourth diagram showing one example of the reply e-mail to the e-mail for editing. With reference to FIG. 14, a modification instruction e-mail template 70D included in the reply e-mail to the e-mail for editing has "Substitution" set in area 73 for inputting a command, has "Attachment" set in area 77 for inputting a parameter, and has the area identification information "4" and "5" set in area 81 for setting the parameters. Thus, the reply e-mail indicates the instruction of the modification to substitute the portions corresponding to area 57 and area 59 respectively specified by the area identification information "4" and "5" of edit image 50 among the five areas included in the original data with the data attached to the reply e-mail.

FIG. 15 is a fourth diagram illustrating one example of the image of the edited data. The edited data shown in FIG. 15 shows the image of the edited data obtained by editing the original data after the reply e-mail shown in FIG. 14 was received. With reference to FIG. 15, it differs from edit image 50 shown in FIG. 6 in that area 57 and area 59 have been deleted and that image 58 of the data attached to the reply e-mail is disposed below area 55. Moreover, the dashed lines within the drawing are added for convenience to indicate area 51, area 53, and area 55 and do not actually exist.

FIG. 16 is a fifth diagram showing one example of the reply e-mail to the e-mail for editing. With reference to FIG. 16, a modification instruction e-mail template 70E included in the reply e-mail to the e-mail for editing has a configuration alteration instruction command "Division" set in area 73 for inputting a command, and has the area identification information "3" set in area 77 for inputting a parameter. Thus, the reply e-mail indicates that the portion corresponding to area 55 specified by the area identification information "3" of edit image 50 among the five areas included in the original data is to be divided into multiple parts.

FIG. 17 is a second diagram illustrating one example of the edit image. An edit image 50A shown in FIG. 17 shows the edit image after it was reconfigured as a result of the reply e-mail shown in FIG. 16 being received. With reference to FIG. 17, edit image 50A differs from edit image 50 shown in FIG. 6 in that area 55 has been divided into three as the three areas of an area 55-1, an area 55-2, and an area 55-3. Accordingly, in place of a section image 55A that existed in edit image 50, a section image 55-1A, a section image 55-2A, and a section image 55-3A respectively enclosing the three areas of area 55-1, area 55-2, and area 55-3, and an area identification information image 55-1B, an area identification information image 55-2B, and an area identification information image 55-3B are included. Moreover, while area identification information image 51B being "1" and area identification information image 53B being "2" are unchanged, area identification information image 55-1B is "3," area identification information image 55-2B is "4," area identification information image 55-3B is "5," area identification information image 57B is "6," and area identification information image 59B is "7."

FIG. 18 is a sixth diagram showing one example of the reply e-mail to the e-mail for editing. With reference to FIG.

18, a modification instruction e-mail template 70F included in the reply e-mail to the e-mail for editing has a configuration alteration instruction command "Combination" set in area 73 for inputting a command, and has the area identification information "3," "4," and "5" set in area 77 for inputting the parameters. Thus, the reply e-mail indicates that the portions corresponding to the three areas of area 55, area 57, and area 59 specified by the area identification information "3," "4," and "5" of edit image 50 among the five areas included in the original data are to be combined into one portion.

Figure 19:
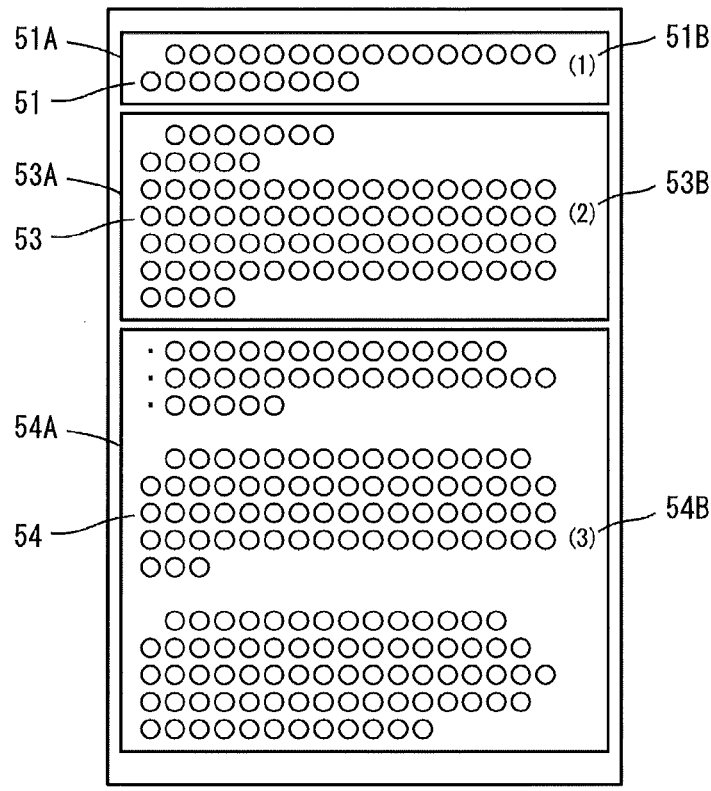
FIG. 19 is a third diagram illustrating one example of the edit image.

FIG. 19 is a third diagram illustrating one example of the edit image. An edit image 50B shown in FIG. 19 shows the edit image after it was reconfigured as a result of the reply e-mail shown in FIG. 18 being received. With reference to FIG. 19, edit image 50B differs from edit image 50 shown in FIG. 6 in that the three areas of area 55, area 57, and area 59 have been combined into one area 54. Accordingly, edit image 50B includes a section image 54A enclosing area 54 and an area identification information image 54B. Moreover, while area identification information image 51B being "1" and area identification information image 53B being "2" are unchanged, area identification information image 54B is "3."

Figure 20:
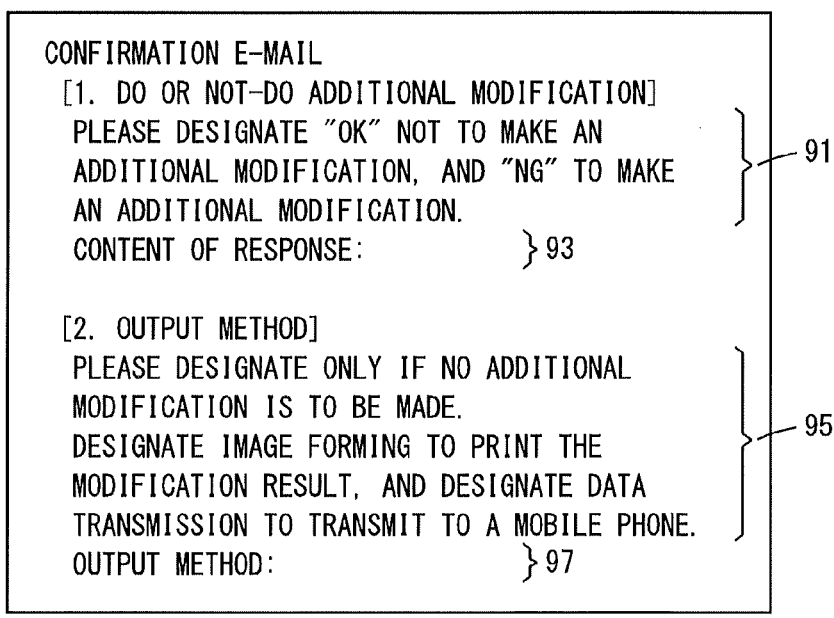
FIG. 20 is a diagram showing one example of a confirmation e-mail template.

FIG. 20 is a diagram showing one example of a confirmation e-mail template. With reference to FIG. 20, a confirmation e-mail template 90 includes support information 91 describing the method of inputting a confirmation result and an area 93 for inputting the confirmation result following the title of "1. Do or Not-Do Additional Modification."

Support information 91 includes the message of "Please designate 'OK' not to make an additional modification and 'NG' to make an additional modification." On the left side of area 93, the message of "Content of Response:" is disposed, which allows the user to know area 93 for inputting the confirmation result.

Further, support information 95 indicating the method of inputting an output method and an area 97 for inputting a command of the output method are included, following the title of "2. Output Method." Support information 95 includes the messages of "Please designate only if no additional modification is to be made" and "Designate image forming to print the modification result, and designate data transmission to transmit to a mobile phone." On the left side of area 97, the message of "Output Method:" is disposed, which allows the user to know area 97 for inputting the command corresponding to the output method and a command that can be set.

Figure 21:
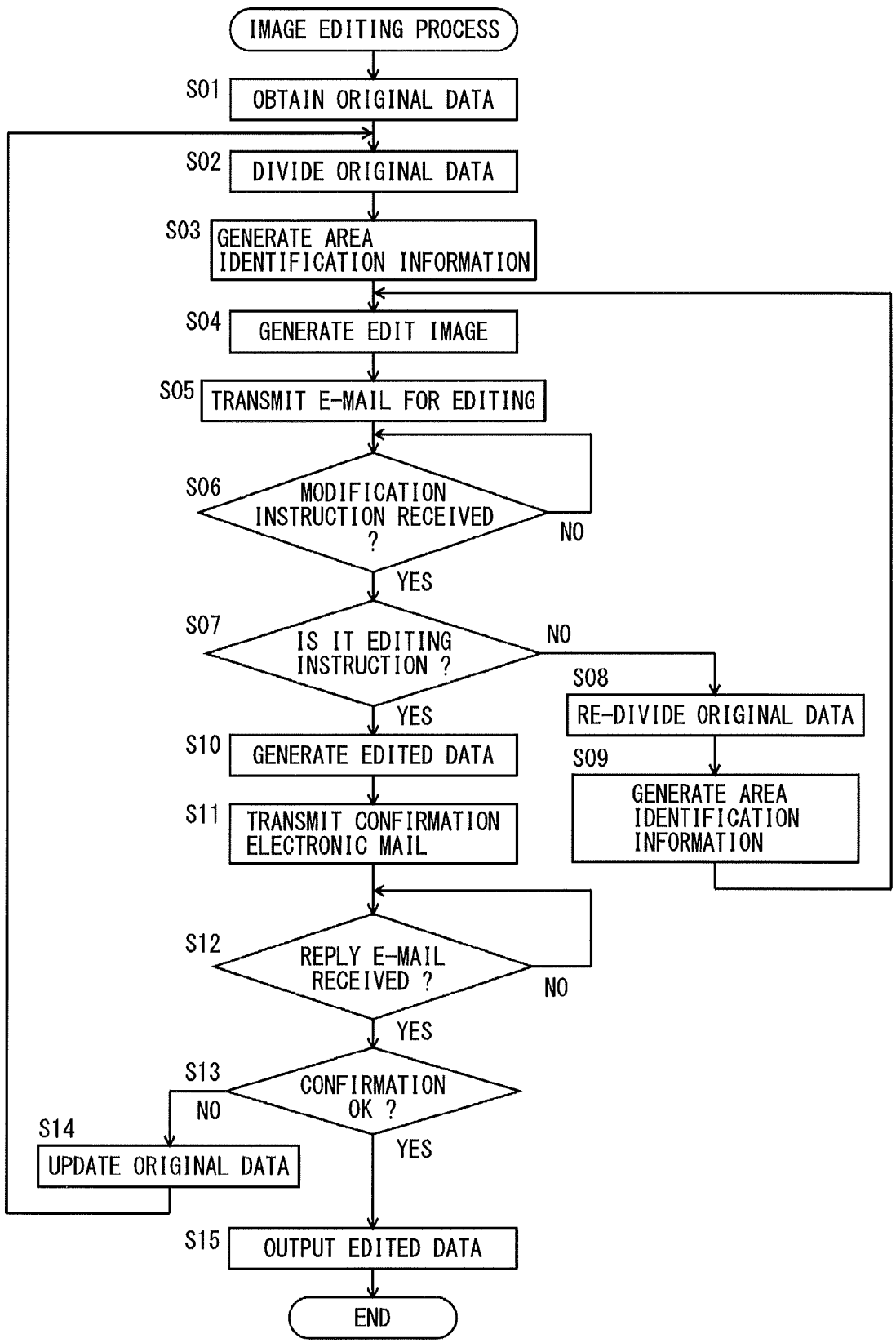
FIG. 21 is a flow chart showing one example of a flow of an image editing process.

FIG. 21 is a flow chart showing one example of a flow of an image editing process. The image editing process shown in FIG. 21 is the process executed by CPU 111 when CPU 111 provided in MFP 100 executes an image editing program stored in ROM 113, EEPROM 115, HDD 116, or CD-ROM 119A. With reference to FIG. 21, CPU 111 obtains original data (step S01). The data designated by the user is obtained as the original data. The original data includes the data stored in HDD 116, the image data scanned by original document scanning portion 123, and the data received from an external computer by network I/F 118.

In a step S02, the obtained original data is divided into a plurality of areas. The division is done per property of an image. In addition, as for the area of the character property, the division is done based on the layout configuration of a document. Further, the division is done paragraph by paragraph. At this stage, for each plurality of areas into which the original data was divided, area information is generated indicating the position of that area within the original data.

Then, in a step S03, area identification information is generated corresponding to each of the plurality of areas. The area identification information may be any information that can identify the plurality of areas. Here, it is a sequential number.

In a step S04, an edit image is generated. The edit image is the image in which the image of the original data is synthesized with a section image enclosing an area and an image of area identification information corresponding to that area for each plurality of areas. In one area, one section image and an image of the area identification information are synthesized. The section image is an image having a shape that encloses the corresponding area. The image of the area identification information is disposed in association with the section image. Here, it is disposed inside the section image. Moreover, as long as it is disposed in association with the section image, the image of the area identification information may be disposed outside of the section image; for instance, it may be disposed in an overlapping manner, or be disposed adjacent to the section image outside the section image. Furthermore, when the section image and the image of the area identification information are to be images of the same color, they may be disposed in separate positions.

In the next step S05, an e-mail for editing including the generated edit image is transmitted. More specifically, an electronic mail which sets the edit image as attachment data, which includes a modification instruction e-mail template in the body text portion, and which sets the electronic mail address assigned to the user who designated the original data in step S01 as the destination address is generated as the e-mail for editing and is transmitted to an electronic mail server.

In the next step S06, it is determined whether a modification instruction has been received or not. The modification instruction is determined to have been received if a reply e-mail corresponding to the e-mail for editing is received from the electronic mail server. The process stands by until the reply e-mail is received (NO in step S06), and if the reply e-mail is received (YES in step S06), the process proceeds to a step S07.

In the next step S07, it is determined whether the received modification instruction is an editing instruction or not. The determination is made based on the command being set in the area for inputting a command in the modification instruction e-mail template included in the reply e-mail received in step S06. If the command being set in the area for inputting a command is an editing instruction command, it is determined to be an editing instruction and the process proceeds to a step S10, but if it is a configuration alteration instruction command, the process proceeds to a step S08. Here, the editing instruction commands are "deletion," "moving," "addition," and "substitution," and the configuration alteration instruction commands are "division" and "combination."

In step S08, the original data is re-divided. The original data is re-divided according to the configuration alteration instruction command received in step S06. More specifically, an area specified by the parameter set in the modification instruction e-mail template included in the reply e-mail among a plurality of areas specified by the area information of the original data is divided or combined according to the configuration alteration instruction command, thereby reconfiguring a plurality of areas specified by the area information. In the next step S09, the area identification information respectively corresponding to a plurality of areas obtained by re-dividing the original data in step S08 is generated, and the process goes back to step S04.

On the other hand, the case where the process proceeds to step S10 is the case where the modification instruction is an editing instruction. More specifically, it is the case where one of the editing instruction commands of "deletion," "moving," "addition," and "substitution" is set in the area for inputting a command in the modification instruction e-mail template included in the reply e-mail received in step S06. In step S10, the original data obtained in step S01 is edited based on the editing instruction command and the parameter to generate the edited data. The parameter is set in the area for inputting a parameter in the modification instruction e-mail template included in the reply e-mail received in step S06.

More specifically, in the case where the editing instruction command is "deletion," the area identification information of the area to be the target of deletion is set as the parameter. Consequently, the edited data is generated by deleting the area specified by the area identification information within the original data from the original data. In the case where the editing instruction command is "moving," the parameters include the area identification information indicating the area where the move originates, the area identification information of the area of the moving destination as the information indicating the moving destination, and the information indicating the relative position in relation to the area of the moving destination. The edited data is generated by moving the area specified by the area identification information of the area to be the target of the move within the original data to the position specified by the information indicating the relative position in relation to the area specified by the area identification information of the area of the moving destination within the original data. In the case where the editing instruction command is "addition," the parameters include data identification information to specify new data, and, for the purpose of specifying the position to add the data, the area identification information of an area and the information indicating the relative position in relation to that area. Consequently, the edited data is generated by adding the data specified by the data identification information to the position specified by the information indicating the relative position in relation to the area specified by the area identification information within the original data. In the case where the editing instruction command is "substitution," the parameters include the data identification information to specify the new data and the area identification information of the area to be the target of substitution. Consequently, the edited data is generated by substituting the data specified by the data identification information for the area specified by the area identification information within the original data.

In the next step S11, a confirmation electronic mail is transmitted which includes the edited data generated in step S10 as data for confirmation. More specifically, an electronic mail which sets the data for confirmation as attachment data, which includes a confirmation e-mail template in the body text portion, and which sets the electronic mail address assigned to the user who designated the original data in step S01 as the destination address is generated as the confirmation electronic mail and is transmitted to an electronic mail server.

In a step S12, it is determined whether a reply e-mail corresponding to the confirmation electronic mail has been received from the electronic mail server or not. The process stands by until the reply e-mail is received (NO in step S12), and if the reply e-mail is received (YES in step S12), the process proceeds to a step S13.

In step S13, it is determined whether the edited data has been approved by the user in the reply e-mail or not. It is determined to have been approved if "OK" is set in the area for inputting the confirmation result in the confirmation e-mail template included in the reply e-mail received in step S12, but if "NG" is set therein, it is determined not to have been approved. If the edited data has been approved by the user, the process proceeds to a step S15, but if not, the process proceeds to a step S14. In step S14, the original data is updated by the edited data, and the process goes back to step S02. The execution of the process beyond step S02 is repeated with the edited data as the new original data.

In step S15, the edited data is outputted. Specifically, the output method is decided based on the command being set in the area for inputting the output method in the confirmation e-mail template included in the reply e-mail received in step S12. More specifically, in the case where the command that instructs image forming is set in the area for inputting the output method in the confirmation e-mail template of the reply e-mail received, the image of the edited data is formed. Specifically, the image of the edited data is formed by image forming portion 125. In addition, in the case where the command for data transmission is set in area 97 for inputting the output method in the confirmation e-mail template of the reply e-mail received in step S12, the edited data is transmitted to a predetermined transmission destination. The transmission destination designated in advance as the transmission destination may be an attendant of a conference, for instance. Moreover, in the case where the information of the transmission destination is set along with the command for data transmission in the reply e-mail, the transmission is made to the transmission destination specified by that transmission destination information.

As described above, MFP 100 according to the present embodiment functions as an image editing device, and when original data is designated by a user, divides an image of the original data into a plurality of areas, synthesizes a section image enclosing the area of interest for each of a plurality of areas as well as generates an edit image in which an image of identification information of the area of interest is disposed in association with the section image, and transmits an e-mail for editing including the edit image. The edit image included in the e-mail for editing associates the section image enclosing the area of interest with the image of the identification information of the area of interest for each of a plurality of areas so that the user may look at the edit image and specify a plurality of parts in the original data respectively. Upon receiving the e-mail for editing including the edit image, the user only needs to do a simple operation of inputting an editing instruction in that electronic mail and transmitting the reply back.

When the editing instruction included in the reply e-mail transmitted back in response to the e-mail for editing is specified, MFP 100 generates edited data obtained by updating the original data based on the editing instruction and forms an image of the edited data or transmits the edited data. The original data is updated based on the editing instruction included in the reply e-mail transmitted back in response to the e-mail for editing so that the user is able to update the original data by generating and transmitting a reply e-mail obtained by editing the e-mail for editing, which allows the editing of the original data by an easy operation.

In addition, the e-mail for editing includes a modification instruction e-mail template in the body text, and the modification instruction e-mail template includes support information for creating an editing instruction for each plurality of areas, an area for inputting the identification information of an area to be the target of editing, and an area for inputting a command for the area to be the target of editing so that the user is able to input the editing instruction into the reply e-mail with ease.

Moreover, the modification instruction e-mail template includes the area for inputting the identification information of the area to be the target of editing and the area for inputting a command for the area to be the target of editing so that the user is able to describe the editing instruction by a character string for each of a plurality of areas into which the image of the original data is divided, which facilitates the inputting of the editing instruction.

Further, since a command to add or substitute an image attached to the reply e-mail in relation to any one of a plurality of areas into which the image of the original data is divided can be described by a character string as the editing instruction, the user is able to cause the execution of the process of adding a new image to the original data or the process of substituting a portion of the original data with a new image.

Furthermore, a configuration alteration instruction command can be entered by a character string in the modification instruction e-mail template included in the reply e-mail to the e-mail for editing, and in such a case, a plurality of areas into which the image of the original data is divided can be altered based on the configuration alteration instruction command. Consequently, a portion to be the target of editing within the original data can be altered, and a portion to be the target of alteration within the original data can be specified with accuracy.

In addition, the modification instruction e-mail template included in the e-mail for editing includes the support information for creating a configuration alteration instruction for each plurality of areas, an area for inputting the identification information of an area to be the target of configuration alteration, and an area for inputting a command for the area to be the target of configuration alteration so that the user is able to input the configuration alteration instruction with ease.

Moreover, the modification instruction e-mail template includes the area for inputting the identification information of the area to be the target of configuration alteration and the area for inputting a configuration alteration instruction command for the area to be the target of configuration alteration so that the user is able to describe the configuration alteration instruction command by a character string for each of a plurality of areas into which the image of the original data is divided, which facilitates the inputting of the configuration alteration instruction.

Further, a confirmation electronic mail including the edited data as the data for confirmation is transmitted back to the user who designated the original data so that the user is able to confirm the edited data. In addition, the edited data is outputted on the condition that a reply e-mail which indicates that the edited data has been approved is received from the user so that only the edited data approved by the user can be outputted.

Furthermore, the edited data as the new original data is divided once again into a plurality of areas and an editing instruction is accepted so that the user is able to repeat the editing of the image of the original data until a desired result is achieved.

Moreover, although MFP 100 is described as an example of an image editing device in the above-described embodiment, it goes without saying that the present invention can be construed as an image editing method which causes MFP 100 to execute the image editing process shown in FIG. 20 or as an image editing program which causes CPU 111 controlling MFP 100 to execute that image editing method.

Although the present invention has been described and illustrated in detail, it is clearly understood that the same is by way of illustration and example only and is not to be taken by way of limitation, the spirit and scope of the present invention being limited only by the terms of the appended claims.

APPENDIX (1) The image editing device according to one of claims 1 to 9, further comprising an image forming portion to form an image, wherein said output portion includes an image forming control portion to cause said image forming portion to form an image of said edited data.

(2) The image editing device according to one of claims 1 to 9 and (1), wherein said output portion includes an edited data transmission portion to transmit said edited data to another computer.

(3) The image editing device according to one of claims 1 to 9, (1) and (2), further comprising an original document scanning portion to scan a sheet of an original document to output image data, wherein said original data is the image data outputted by said original document scanning portion.

(4) The image editing device according to one of claims 1 to 9, and (1) to (3), further comprising a print data reception portion to receive print data, wherein said original data is said print data received.

What is claimed is:

1. An image editing device, comprising:
 a division portion to divide an image of original data into a plurality of areas;
 an area specifying portion to associate, for each of said plurality of areas divided, identification information for identifying an area of interest with the area of interest;
 an image generating portion to generate an edit image for editing by disposing, for each of said plurality of areas, a section image enclosing the area of interest onto the image of said original data and further disposing an image indicating the identification information of the area of interest in association with said section image;
 a transmission portion to transmit a first electronic mail including said edit image generated;
 a reception portion to receive a second electronic mail transmitted back in response to said first electronic mail transmitted;
 an editing portion to generate edited data by updating said original data based on an editing instruction included in said second electronic mail received by said reception portion; and
 an output portion to output said edited data generated.

2. The image editing device according to claim 1, wherein said first electronic mail includes support information for creating an editing instruction for each of said plurality of areas, an area for inputting the identification information of an area to be a target of editing among said plurality of areas, and an area for inputting a command for the area to be the target of editing.

3. The image editing device according to claim 1, wherein said editing instruction includes, as a set, identification information of an editing target area to be the target of editing among said plurality of areas and a command to alter disposition of said editing target area or a command to delete said editing target area, and said second electronic mail includes a character string describing said editing instruction.

4. The image editing device according to claim 1, wherein said editing instruction includes, as a set, information indicating that an attached image is to be used anew, identification information of an area for designating a position to add the new image or identification information of an area to be substituted by said new image, and a command for addition or for substitution, and said second electronic mail includes a character string describing said editing instruction.

5. The image editing device according to claim 1, wherein said division portion includes a re-dividing portion to alter configuration of said plurality of areas into which the image of said original data is divided, based on a configuration alteration instruction included in said second electronic mail received by said reception portion.

6. The image editing device according to claim 5, wherein said first electronic mail includes support information for creating a configuration alteration instruction for each of said plurality of areas, an area for inputting identification information of an area to be a target of configuration alteration among said plurality of areas, and an area for inputting a command for the area to be the target of configuration alteration.

7. The image editing device according to claim 5, wherein said configuration alteration instruction includes, as a set, identification information of an area to be a target of configuration alteration among said plurality of areas and a command to divide or combine at least one area to be the target of configuration alteration, and said second electronic mail includes a character string describing said configuration alteration instruction.

8. The image editing device according to claim 1, wherein said output portion includes a data transmission portion to transmit back a third electronic mail including said edited data generated, and a confirmation portion to output said edited data generated, on the condition that an electronic mail approving the edited data included in said third electronic mail is received.

9. The image editing device according to claim 1, further comprising an editing instruction accepting portion to accept an editing instruction for said edited data, wherein said editing portion edits said edited data further and generates new edited data, based on the editing instruction accepted.

10. The image editing device according to claim 1, further comprising a processor, wherein the processor is configured to implement the division portion, the area specifying portion, the image generating portion, the transmission portion, the reception portion, the editing portion, and the output portion.

11. The image editing device according to claim 1, wherein the area specifying portion associates a unique identification information with each of the plurality of areas.

12. An image editing method to cause an image editing device to execute:

a dividing step to divide an image of original data into a plurality of areas;

an area specifying step to associate, for each of said plurality of areas divided, identification information for identifying an area of interest with the area of interest;

an image generating step to generate an edit image by disposing, for each of said plurality of areas, a section image enclosing the area of interest onto the image of said original data and further disposing an image indicating the identification information of the area of interest in association with said section image;

a transmitting step to transmit a first electronic mail with said edit image generated attached thereto;

a receiving step to receive a second electronic mail transmitted back in response to said first electronic mail transmitted;

an editing executing step to generate edited data by updating said original data based on an editing instruction included in said second electronic mail received in said receiving step; and an outputting step to output said edited data generated.

13. The image editing method according to claim 12, wherein said first electronic mail includes support information for creating an editing instruction for each of said plurality of areas, an area for inputting the identification information of an area to be a target of editing among said plurality of areas, and an area for inputting a command for the area to be the target of editing.

14. The image editing method according to claim 12, wherein said editing instruction includes, as a set, identification information of an editing target area to be the target of editing among said plurality of areas and a command to alter disposition of said editing target area or a command to delete said editing target area, and said second electronic mail includes a character string describing said editing instruction.

15. The image editing method according to claim 12, wherein said editing instruction includes, as a set, information indicating that an attached image is to be used anew, identification information of an area for designating a position to add the new image or identification information of an area to be substituted by said new image, and a command for addition or for substitution, and said second electronic mail includes a character string describing said editing instruction.

16. The image editing method according to claim 12, wherein said dividing step includes a re-dividing step to alter configuration of said plurality of areas into which the image of said original data is divided, based on a configuration alteration instruction included in said second electronic mail received in said receiving step.

17. The image editing method according to claim 16, wherein said first electronic mail includes support information for creating a configuration alteration instruction for each of said plurality of areas, an area for inputting identification information of an area to be a target of configuration alteration among said plurality of areas, and an area for inputting a command for the area to be the target of configuration alteration.

18. The image editing method according to claim 16, wherein said configuration alteration instruction includes, as a set, identification information of an area to be a target of configuration alteration among said plurality of areas and a command to divide or combine at least one area to be the target of configuration alteration, and said second electronic mail includes a character string describing said configuration alteration instruction.

19. The image editing method according to claim 12, wherein said outputting step includes a confirmation data transmitting step to transmit back a third electronic mail including said edited data generated, and a confirming step to output said edited data generated, on the condition that an electronic mail approving the edited data included in said third electronic mail is received.

20. The image editing method according to claim 12, further comprising an editing instruction accepting step to accept an editing instruction for said edited data, wherein said editing executing step includes editing said edited data further and generating new edited data, based on the editing instruction accepted.

21. The image editing method according to claim 12, wherein said identification information is unique with respect to each of the plurality of areas.

22. A non-transitory computer-readable recording medium encoded with an image editing program performed by a computer to cause the computer to execute:
a dividing step to divide an image of original data into a plurality of areas;
an area specifying step to associate, for each of said plurality of areas divided, identification information for identifying an area of interest with the area of interest;
an image generating step to generate an edit image by disposing, for each of said plurality of areas, a section image enclosing the area of interest onto the image of said original data and further disposing an image indicating the identification information of the area of interest in association with said section image;
a transmitting step to transmit a first electronic mail with said edit image generated attached thereto;
a receiving step to receive a second electronic mail transmitted back in response to said first electronic mail transmitted;
an editing executing step to generate edited data by updating said original data based on an editing instruction included in said second electronic mail received in said receiving step; and
an outputting step to output said edited data generated.

23. The image editing program according to claim 22, wherein said first electronic mail includes support information for creating an editing instruction for each of said plurality of areas, an area for inputting the identification information of an area to be a target of editing among said plurality of areas, and an area for inputting a command for the area to be the target of editing.

24. The image editing program according to claim 22, wherein said editing instruction includes, as a set, identification information of an editing target area to be the target of editing among said plurality of areas and a command to alter disposition of said editing target area or a command to delete said editing target area, and
said second electronic mail includes a character string describing said editing instruction.

25. The image editing program according to claim 22, wherein said editing instruction includes, as a set, information indicating that an attached image is to be used anew, identification information of an area for designating a position to add the new image or identification information of an area to be substituted by said new image, and a command for addition or for substitution, and
said second electronic mail includes a character string describing said editing instruction.

26. The image editing program according to claim 22, wherein said dividing step includes a re-dividing step to alter configuration of said plurality of areas into which the image of said original data is divided, based on a configuration alteration instruction included in said second electronic mail received in said receiving step.

27. The image editing program according to claim 26, wherein said first electronic mail includes support information for creating a configuration alteration instruction for each of said plurality of areas, an area for inputting identification information of an area to be a target of configuration alteration among said plurality of areas, and an area for inputting a command for the area to be the target of configuration alteration.

28. The image editing program according to claim 26, wherein said configuration alteration instruction includes, as a set, identification information of an area to be a target of configuration alteration among said plurality of areas and a command to divide or combine at least one area to be the target of configuration alteration, and
said second electronic mail includes a character string describing said configuration alteration instruction.

29. The image editing program according to claim 22, wherein said outputting step includes
a confirmation data transmitting step to transmit back a third electronic mail including said edited data generated, and
a confirming step to output said edited data generated, on the condition that an electronic mail approving the edited data included in said third electronic mail is received.

30. The image editing program according to claim 22, further causing said computer to execute an editing instruction accepting step to accept an editing instruction for said edited data, wherein
said editing executing step includes editing said edited data further and generating new edited data, based on said editing instruction accepted.

31. The image editing program according to claim 22, wherein said identification information is unique with respect to each of the plurality of areas.

* * * * *